US008422596B2

(12) United States Patent
Tomizawa

(10) Patent No.: US 8,422,596 B2
(45) Date of Patent: Apr. 16, 2013

(54) COMMUNICATION DEVICE, COMMUNICATION METHOD, AND PROGRAM

(75) Inventor: Hidekazu Tomizawa, Tokyo (JP)

(73) Assignee: Sony Corporation, Tokyo (JP)

( * ) Notice: Subject to any disclaimer, the term of this patent is extended or adjusted under 35 U.S.C. 154(b) by 531 days.

(21) Appl. No.: 12/714,794

(22) Filed: Mar. 1, 2010

(65) Prior Publication Data

US 2010/0226461 A1 Sep. 9, 2010

(30) Foreign Application Priority Data

Mar. 4, 2009 (JP) ................................ P2009-050201

(51) Int. Cl.
*H04L 27/06* (2006.01)
(52) U.S. Cl.
USPC ........... 375/340; 375/268; 375/272; 375/316; 375/320; 375/322; 375/334; 329/300; 329/315; 455/130; 455/324; 340/5.6
(58) Field of Classification Search .................. 375/268, 375/272, 316, 320, 322, 334, 340; 329/300, 329/315; 455/130, 324; 340/5.6
See application file for complete search history.

(56) References Cited

U.S. PATENT DOCUMENTS

| 2003/0178483 | A1* | 9/2003 | Wakabayashi | 235/380 |
| 2003/0197598 | A1* | 10/2003 | Hayashi | 340/310.07 |
| 2005/0231331 | A1 | 10/2005 | Kang | |
| 2006/0052055 | A1 | 3/2006 | Rowse et al. | |
| 2007/0188297 | A1* | 8/2007 | Nakane et al. | 340/5.6 |
| 2008/0084310 | A1 | 4/2008 | Nikitin et al. | |

FOREIGN PATENT DOCUMENTS

| EP | 2 009 573 | 12/2008 |
| JP | 2003-233787 | 8/2003 |
| JP | 2004-200117 | 7/2004 |
| JP | 2005-339141 | 12/2005 |
| JP | 2006-060363 | 3/2006 |
| JP | 2008-059271 | 3/2008 |
| WO | 9852168 | 11/1998 |

OTHER PUBLICATIONS

European Patent Office, Extended European Search Report issued in connection with European Patent Application No. 10154635.6, dated Jun. 6, 2012. (6 pages).

* cited by examiner

*Primary Examiner* — Leon Flores
(74) *Attorney, Agent, or Firm* — K&L Gates LLP

(57) ABSTRACT

A communication device includes: demodulating means for demodulating a transmission signal from another communication device that performs noncontact communication; calculating means for performing at least one of addition and subtraction of a predetermined voltage according to a logical value of a demodulated signal obtained by demodulation by the demodulating means; determining means for determining a communication system of the transmission signal transmitted by the other communication device by comparing a calculation result of the calculating means at predetermined timing after a lapse of a predetermined time from the start of communication with a threshold voltage; and transmitting means for transmitting predetermined data to the other communication device in the communication system determined by the determining means among plural communication systems that the device itself can support.

13 Claims, 16 Drawing Sheets

TypeA
ASK 100%-Miller (106kbps)

TypeB
ASK 10%-NRZ (106kbps)

TypeF
ASK 10%-Manchester (212kbps,424kbps)

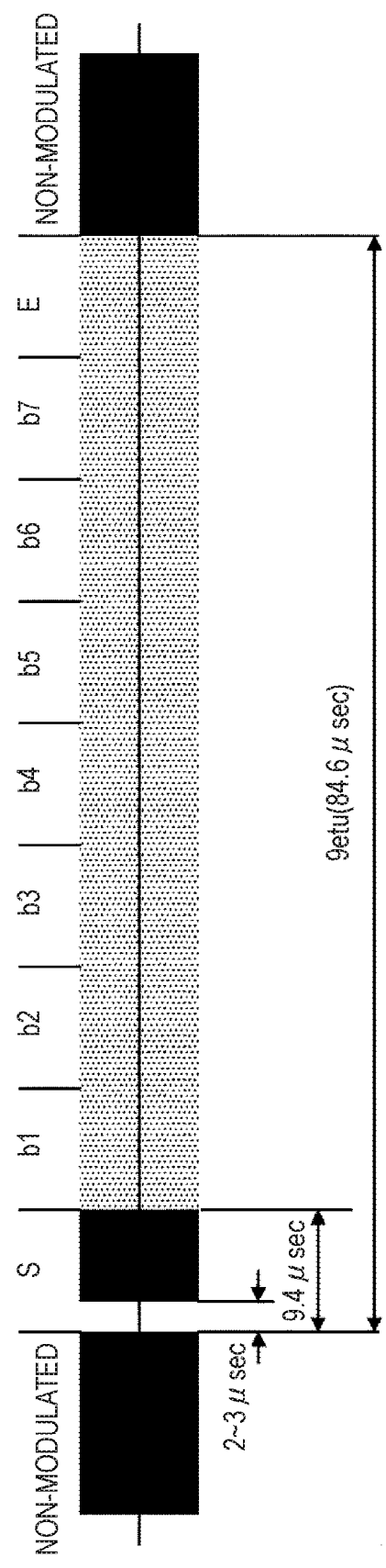

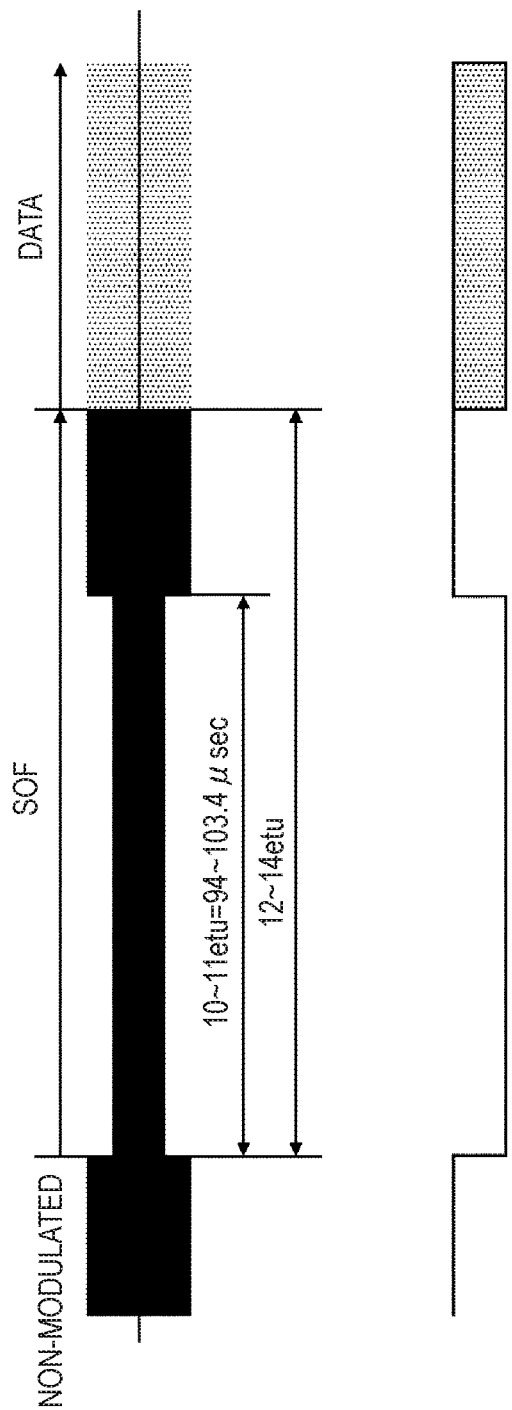

COMMUNICATION DEVICE, COMMUNICATION METHOD, AND PROGRAM

CROSS REFERENCES TO RELATED APPLICATIONS

The present application claims priority to Japanese Priority Patent Application JP 2009-050201 filed in the Japan Patent Office on Mar. 4, 2009, the entire contents of which is hereby incorporated by reference.

BACKGROUND

The present application relates to a communication device, a communication method, and a program, and specifically, to a communication device, a communication method, and a program that can establish communication with a simple configuration in a short time for plural communication systems.

Near Field Communication systems for near-field wireless noncontact communication using IC (Integrated Circuit) cards are widely used. For example, uses for electronic tickets and electronic money are well known. Further, recently, cellular phones having functions of electronic tickets and electronic money by noncontact wireless communication have been in widespread use.

The Near Field Communication systems have been rapidly spread on a global scale and become international standards. For example, as the international standards, there are ISO/IEC 14443 as a standard of near-field IC card system, and ISO/IEC 18092 as a standard of FCIP (Near Field Communication Interface and Protocol)-1, etc.

The Near Field Communication according to ISO/IEC 18092 includes an active mode and a passive mode. The active mode is a communication mode of transmitting data by outputting electromagnetic waves respectively in plural communication devices for transmitting and receiving data, and modulating the electromagnetic waves. The passive mode is a mode of transmitting data by outputting electromagnetic waves in one communication device (initiator) of plural communication devices, and modulating the electromagnetic waves. Another one communication device (target) of the plural communication devices transmits data by load-modulating the electromagnetic waves output from the initiator.

Further, in the IC card system of ISO/IEC 14443, for example, there are various communication systems called Type A, Type B, and Type C.

Type A is employed as MIFARE (registered trademark) system of Phillips. In Type A, data encoding by Miller is performed in data transfer from a reader writer to an IC card and data encoding by Manchester is performed in data transfer from the IC card to the reader writer. Further, in Type A, a data communication rate of 106 kbps (kilo bit per second) is employed.

In Type B, data encoding by NRZ is performed in data transfer from a reader writer to an IC card and data encoding by NRZ-L is performed in data transfer from the IC card to the reader writer. Further, in Type B, a data communication rate of 106 kbps is employed.

Type C is employed as FeliCa (registered trademark) system of Sony as the applicant, for example, and data encoding by Manchester is performed in data transfer between a reader writer and an IC card. Further, in Type C, a data communication rate of 212 kbps is employed.

The above described various communication systems are standardized and operated, and there are applications compliant with plural communication system at the reader writer side.

On the other hand, at the IC card side, a platform in which plural applications may be installed in one IC card has been developed. Further, the IC card has been used in various uses not only the use for electric money but also the use for Basic Resident Resistor card etc., and is expected to become more popular. Accordingly, various technologies for the IC card to support plural communication systems have been proposed.

For example, a method of determining one communication system among plural communication systems by switching standby communication systems at fixed time intervals and determining a communication system by which correct decoding result is obtained and communication is established is proposed (e.g., see JP-A-2003-233787).

However, in the method, it may be possible that the time to establishment of communication becomes longer. On this account, there is a method of saving the communication history in the past, and performing trials of communication establishment preferentially from the communication system having the highest possibility of establishment of communication (e.g., see JP-A-2005-339141).

Further, a method of providing reception circuits respectively corresponding to plural communication systems, simultaneously executing reception processing with the circuits, and performing the subsequent communication using a communication system in which reception has been confirmed is proposed (e.g., see JP-A-2006-060363 and JP-A-2008-059271).

Furthermore, a method of determining a communication system by preparing a general-purpose circuit independent of communication system, i.e., an AD converter and processing results from high-speed sampling at a frequency of a carrier signal using software is proposed (e.g., see JP-A-2004-200117).

SUMMARY

However, according to the method of switching communication systems at fixed time intervals as proposed in JP-A-2003-233787, the time to start of the communication may be longer as described above. In the case of using the history in the past as in JP-A-2005-339141, although the probability of starting the communication in a shorter time than in the case of not using the history in the past may be higher, but the problem is not fundamentally solved because the next communication system and the communication systems used for communication in the past may have no relation to each other.

In the case where the reception circuits respectively corresponding to plural communication systems are provided as proposed in JP-A-2006-060363 and JP-A-2008-059271, although the time to start of communication may be reduced, the circuit size is increased and the manufacturing cost becomes higher. Further, in the method of JP-A-2006-060363, it is necessary to prepare sampling circuits in the number of the plural communication systems to be detected.

In the method of JP-A-2004-200117, development of ASIC (Application Specific Integrated Circuit) or the like is unnecessary with respect to each communication system as a target of reception, but only development of software for processing of sampling results may be necessary. Since the cost of ASIC development is generally higher than the cost of software development, the method of JP-A-2004-200117 has an advantage that the development cost can be suppressed.

However, in JP-A-2004-200117, a reader writer that can be provided with sufficient power performs software processing using the high-speed sampling results, and it is considered difficult to perform the same processing in the IC card for the following reasons. That is, the high-speed sampling using the AD converter is necessary and the higher operation frequency of the CPU is necessary for performing software processing at a sufficient speed, and thus, increase in power consumption is expected. Further, because of the increase in power consumption due to the software processing and the like, reduction in performance of wireless communication of the IC card (e.g., a range in which communication can be made) is also concerned.

It is desirable to realize establishment of communication with a simple configuration in a short time for plural communication systems.

A communication device according to an embodiment includes: demodulating means for demodulating a transmission signal from another communication device that performs noncontact communication; calculating means for performing at least one of addition and subtraction of a predetermined voltage according to a logical value of a demodulated signal obtained by demodulation by the demodulating means; determining means for determining a communication system of the transmission signal transmitted by the other communication device by comparing a calculation result of the calculating means at predetermined timing after a lapse of a predetermined time from the start of communication with a threshold voltage; and transmitting means for transmitting predetermined data to the other communication device in the communication system determined by the determining means among plural communication systems that the device itself can support.

A communication method according to an embodiment using a communication device that performs noncontact communication with another communication device includes the steps of:

performing at least one of addition and subtraction of a predetermined voltage according to a logical value of a demodulated signal obtained by demodulation of a transmission signal from the other communication device; determining a communication system of the transmission signal transmitted by the other communication device by comparing a calculation result at predetermined timing after a lapse of a predetermined time from the start of communication with a threshold voltage; and transmitting predetermined data to the other communication device in the communication system determined among plural communication systems that the device itself can support.

A program according to an embodiment allows a computer to execute a process including the steps of:

performing at least one of addition and subtraction of a predetermined voltage according to a logical value of a demodulated signal obtained by demodulation of a transmission signal from another communication device that performs noncontact communication; determining a communication system of the transmission signal transmitted by the other communication device by comparing a calculation result at predetermined timing after a lapse of a predetermined time from the start of communication with a threshold voltage; and transmitting predetermined data to the other communication device in the communication system determined among plural communication systems that the device itself can support.

In an embodiment, at least one of addition and subtraction of the predetermined voltage is performed according to the logical value of the demodulated signal obtained by demodulation of the transmission signal from another communication device that performs noncontact communication, the communication system of the transmission signal transmitted by the other communication device is determined by comparing the calculation result at predetermined timing after the lapse of the predetermined time from the start of communication with the threshold voltage, and the predetermined data is transmitted to the other communication device in the communication system determined among plural communication systems that the device itself can support.

The program may be provided by transmission via a transmission medium or recording in a recording medium.

The communication device may be an independent device or an internal block forming one device.

According to the embodiments of the invention, communication can be established with a simple configuration in a short time for plural communication systems.

Additional features and advantages are described herein, and will be apparent from the following Detailed Description and the figures.

BRIEF DESCRIPTION OF THE FIGURES

FIG. 3 shows an initial transmission waveform at the start of communication of Type A.

FIGS. 6A and 6B show a transmission waveform of Type B and an example of a demodulated signal obtained by binarization of the waveform.

DETAILED DESCRIPTION

The present application will be described below in greater detail with reference to the drawings according to an embodiment.

Explanation of communication system of communication performed by IC card of embodiment.

An IC (Integrated Circuit) card 1 (FIG. 2) to which an embodiment is applied is a communication device that performs noncontact communication with a reader writer (not shown) as another communication device. The IC card 1 supports plural communication systems and determines the communication system of the transmission signal transmitted by the reader writer. Then, the IC card 1 responses in the communication system obtained as a determination result, and makes communication with the reader writer.

Specifically, the IC card 1 is compliant with a total of three types of communication systems of the types called Type A and Type B of ISO/IEC 14443 and a passive mode of ISO/IEC 18092. In the passive mode of ISO/IEC 18092, there are two types of communication rates of 212 kbps (kilo bit per second) and 424 kbps.

In the explanation as below, Type A and Type B of ISO/IEC 14443 will be simply referred to as "Type A" and "Type B". Further, the communication system of the communication in the passive mode of ISO/IEC 18092 at the communication rates of 212 kbps and 424 kbps are appropriately referred to as "Type F at 212 kbps and 424 kbps".

First, the respective communication systems of Type A, Type B, and Type F will be briefly explained with reference to FIGS. 1A to 1C.

Figure 1A:
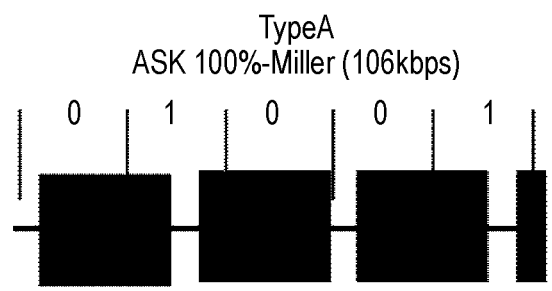
FIGS. 1A to 1C are diagrams for explanation of respective communication systems of Type A, Type B, and Type F.

FIG. 1A shows a communication system of Type A.

Type A is employed as MIFARE (registered trademark) of Phillips.

In Type A, ASK (amplitude Shift Keying) modulation at 100% of modulation degree is employed for the modulation method when data is transmitted from a reader writer to the IC card 1. Further, as the data encoding method, Miller is adopted in data transfer from the reader writer to the IC card 1 and Manchester is adopted in data transfer from the IC card 1 to the reader writer. The data communication rate is 106 kbps (kilo bit per second).

Figure 1B:
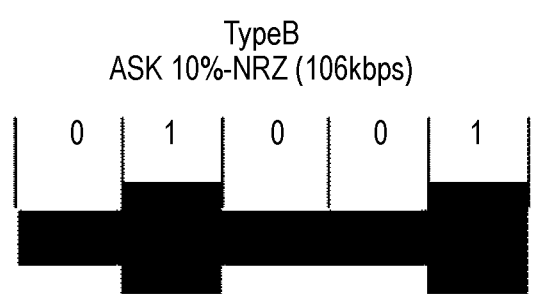

FIG. 1B shows a communication system of Type B.

In Type B, ASK modulation at 10% of modulation degree is employed for the modulation method when data is transmitted from a reader writer to the IC card 1.

Further, as the data encoding method, NRZ is adopted in data transfer from the reader writer to the IC card 1 and NRZ-L is adopted in data transfer from the IC card 1 to the reader writer. The data communication rate is 106 kbps.

Figure 1C:
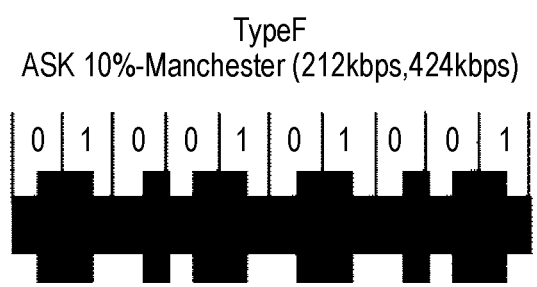

FIG. 1C shows a communication system of Type F.

In Type F, ASK modulation at 10% of modulation degree is employed for the modulation method when data is transmitted from a reader writer to the IC card 1.

Further, as the data encoding method, Manchester is adopted both in data transfer from the reader writer to the IC card 1 and in data transfer from the IC card 1 to the reader writer. There are two types of communication rates of 212 kbps and 424 kbps as described above.

Accordingly, Type A, Type B, and Type F have a commonality in that ASK modulation is used in the modulation method of transmitting data from the reader writer to the IC card 1. Note that the modulation degrees are different between Type A and Types B and F. The modulation degree of Type A is 100%, and the modulation degrees of Types B and F are 10%. Further, regarding the modulation method of transmitting data from the IC card 1 to the reader writer, Type B using BPSK (Binary Phase Shift Keying) is different from Type A and Type F using ASK modulation.

Configuration example of IC card.

Figure 2:
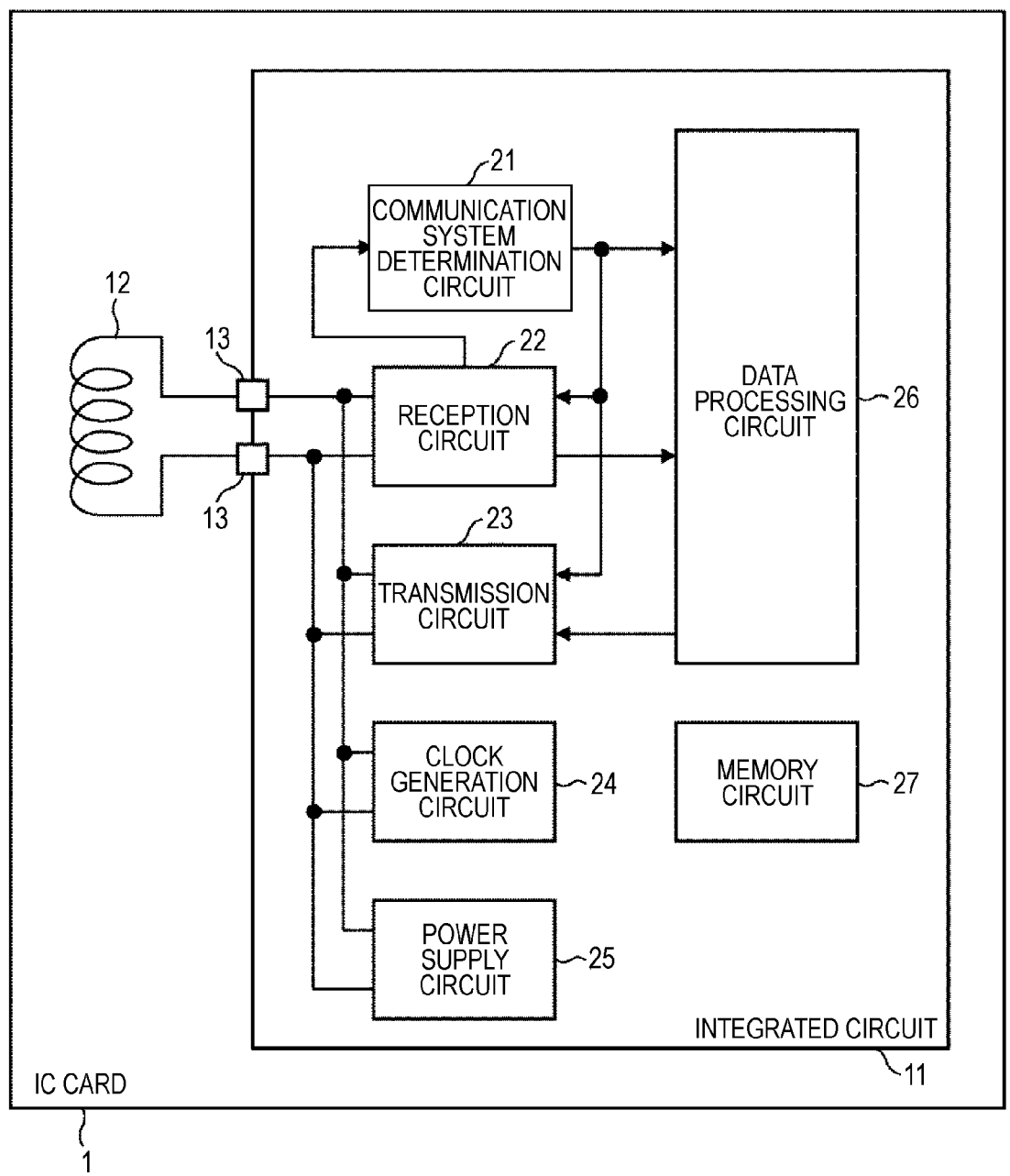
FIG. 2 is a block diagram showing a configuration example of an IC card of one embodiment of the invention.

FIG. 2 is a block diagram showing a configuration example of the IC card 1.

The IC card 1 includes an integrated circuit 11 and an antenna 12, and antenna connecting terminals 13 that connect them.

The integrated circuit 11 includes a communication system determination circuit 21, a reception circuit 22, a transmission circuit 23, a clock generation circuit 24, a power supply circuit 25, a data processing circuit 26, and a memory circuit 27.

The antenna 12 receives electromagnetic wave output from a reader writer. In the antenna 12, a current flows by the electromagnetic induction due to the electromagnetic wave from the reader writer.

The communication system determination circuit 21 determines the communication system of the reader writer and supplies the determination result to the reception circuit 22, the transmission circuit 23, and the data processing circuit 26.

In order that the communication system determination circuit 21 may determine the communication system, the reception circuit 22 supplies a demodulated signal (binarized signal) formed by demodulating (binarizing) the signal received by the antenna 12 to the communication system determination circuit 21.

Further, the reception circuit 22 demodulates the signal received by the antenna 12 according to the communication system as the determination result supplied from the communication system determination circuit 21, and further decodes the signal. That is, as described above, the coding method differs depending on which one of Type A, Type B, and Type F the communication system is. Accordingly, the reception circuit 22 decodes the signal according to the decoding method for the communication system as the determination result supplied from the communication system determination circuit 21, and supplies the resulting data to the data processing circuit 26.

The transmission circuit 23 codes and modulates the data supplied from the data processing circuit 26 according to the communication system as the determination result supplied from the communication system determination circuit 21. That is, since the coding method and modulation method differ depending on the communication system, the transmission circuit 23 changes the coding method and modulation method according to the determination result supplied from the communication system determination circuit 21, and codes and modulates the data obtained from the data processing circuit 26.

Note that the transmission circuit 23 changes the impedance when the antenna 12 is regarded as a coil according to the data supplied from the data processing circuit 26. As the impedance changes, the RF field (magnetic field) formed when the reader writer outputs electromagnetic wave as carrier wave changes. Thereby, the carrier wave as the electromagnetic wave output by the reader writer is modulated (load-modulated) according to the data, and the date output by the data processing circuit 26 is transmitted to the reader writer outputting the electromagnetic wave.

The clock generation circuit 24 generates a reference clock as reference of operation timing from the signal received by the antenna 12 and supplies it to the respective parts within the integrated circuit 11.

The power supply circuit 25 acquires power necessary for driving of the IC card 1 by rectifying the current flowing in the antenna 12, and supplies it to the respective parts within the integrated circuit 11.

The data processing circuit 26 includes a CPU (Central Processing Unit), a ROM (Read Only Memory), etc. (not shown), and is activated when the power necessary for driving is supplied from the power supply circuit 25. The CPU executes a program stored in the memory circuit 27, and thereby, the data processing circuit 26 executes predetermined processing based on the data supplied from the reception circuit 22. Further, the data processing circuit 26 supplies the data to be transmitted to the reader writer to the transmission circuit 23 as a processing result.

The memory circuit 27 includes an EEPROM (Electrically and Erasable Programmable Read Only Memory), a RAM (Random Access Memory), etc. The memory circuit 27 stores programs to be executed by the data processing circuit 26 and data necessary for operation of the data processing circuit 26.

If the IC card 1 having the above described configuration may not be necessary to support plural communication systems, but necessary to support only a single communication system, the configuration of the IC card 1 is the same as a configuration formed by removing the communication system determination circuit 21 from the configuration. In other words, the operation of the IC card 1 after the communication system of the signal transmitted by the reader writer is determined by the communication system determination circuit 21 and the control of the reception circuit 22, the transmission circuit 23, and the data processing circuit 26 is changed is the same as that for the single communication system.

Now, the operation of the IC card 1 after control by the communication system as the determination result will be briefly explained.

First, the power supply circuit 25 acquires the power necessary for driving of the IC card 1 from the current flowing in the antenna 12 and supplies it to the respective parts within the integrated circuit 11. The clock generation circuit 24 extracts a carrier wave frequency from the signal received by the antenna 12, generates the reference clock from it, and supplies it to the respective parts within the integrated circuit 11. In the respective communication systems of Type A, Type B, and Type F, the carrier wave frequency fc is 13.56 MHz.

The reception circuit 22 demodulates the signal supplied from the antenna 12 using the demodulation method corresponding to a predetermined modulation method, and decodes it using the decoding method corresponding to a predetermined coding method. The reception circuit 22 supplies a command or data obtained by decoding to the data processing circuit 26.

The data processing circuit 26 performs processing based on the command or the data supplied from the reception circuit 22. Then, the data processing circuit 26 supplies a response command corresponding to the received command and predetermined data as a data processing result corresponding to the received command, for example, to the transmission circuit 23.

The transmission circuit 23 codes the response command or the data supplied from the data processing circuit 26 using a predetermined coding method, modulates (load-modulates) it using a predetermined modulation method, and transmits it to the reader writer.

After the determination of the communication system, the following operation is performed.

Next, determination processing of the communication system by the communication system determination circuit 21 will be explained. As below, the command and the response command and data exchanged with the reader writer are not distinguished but all of them are referred to as data.

The communication system determination circuit 21 determines the communication system using features of the demodulated signal obtained by demodulating the modulated signal in a predetermined period from the start of transmission of the reader writer.

Referring to FIGS. 3 to 7B, the features of the demodulated signals obtained by demodulating the modulated signals transmitted in the respective communication systems of Type A, Type B, and Type F will be explained in detail.

Initial demodulated signal at start of communication of Type A.

FIG. 3 shows a waveform (transmission waveform) of the transmission signal first transmitted from the reader writer when the communication system is Type A.

In Type A, as shown in FIG. 3, a set of 9 bits formed by adding a start bit S to the head of 7 bits of data b1 to b7 and adding an end bit E to the end of the data b1 to b7 is transmitted from the reader writer.

The transmission time of the set of 9 bits is 9 etu. Here, "etu" is an abbreviation of "elementary time unit", and indicates the unit of a reference time corresponding to a time necessary for transmission of 1 bit. Since the communication rate of Type A is 106 kbps, 1 etu is about 9.4 μec. Therefore, the transmission time of the set of 9 bits is about 84.6 μec.

Of the set of 9 bits, the start bit S indicting the start of communication has a waveform representing the logical "0", however, the data b1 to b7 and the end bit indicating the end of the communication are indefinite, the logical "0" or the logical "1", and shown in gray in FIG. 3.

Figure 4A:
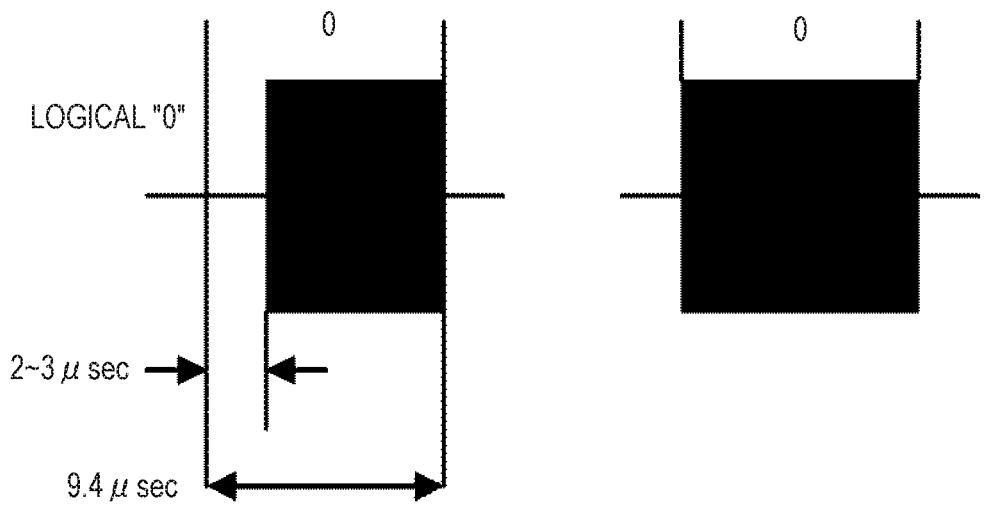
FIGS. 4A and 4B show transmission waveforms of logical "0" and logical "1" of Type A.

As shown in FIG. 4A, the logical "0" is expressed by a waveform having a modulated part in an initial predetermined period in 1 etu and non-modulated in the subsequent part, or a waveform constantly non-modulated during 1 etu. Which one of the waveforms expressing the logical "0" is employed depends on the waveform (logical value) immediately before. In the start bit S of the set of 9 bits in FIG. 3, since the part immediately before is a non-modulated section, the waveform of logical "0" having a modulated part in an initial predetermined period in 1 etu and non-modulated in the subsequent part is employed.

Figure 4B:
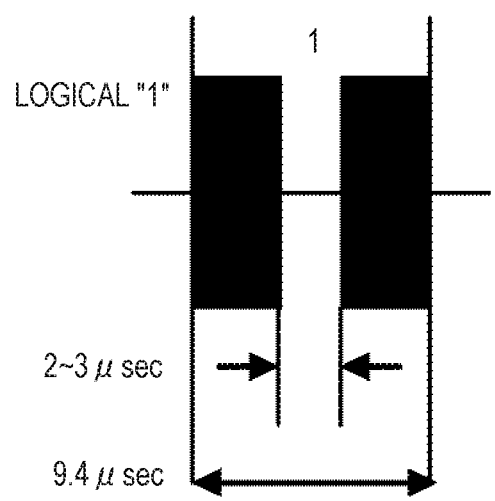

On the other hand, as shown in FIG. 4B, the logical "1" is expressed by a waveform having a modulated part at the center part of 1 etu.

Here, the modulated parts of the logical "0" and the logical "1" are determined in 2 to 3 μsec. In other words, in either of the logical "0" or the logical "1", the non-modulated part of 6.4 to 7.4 μsec in 1 etu surely exists.

Therefore, Type A has a feature that the ratio of the non-modulated part in 1 etu is equal to or more than 6.4/9.4=0.68. Further, in whatever the data in the part shown in gray in FIG. 3, the ratio of the non-modulated part is equal to or more than 0.68 in the entire set of 9 bits.

Figures 5A, 5B:
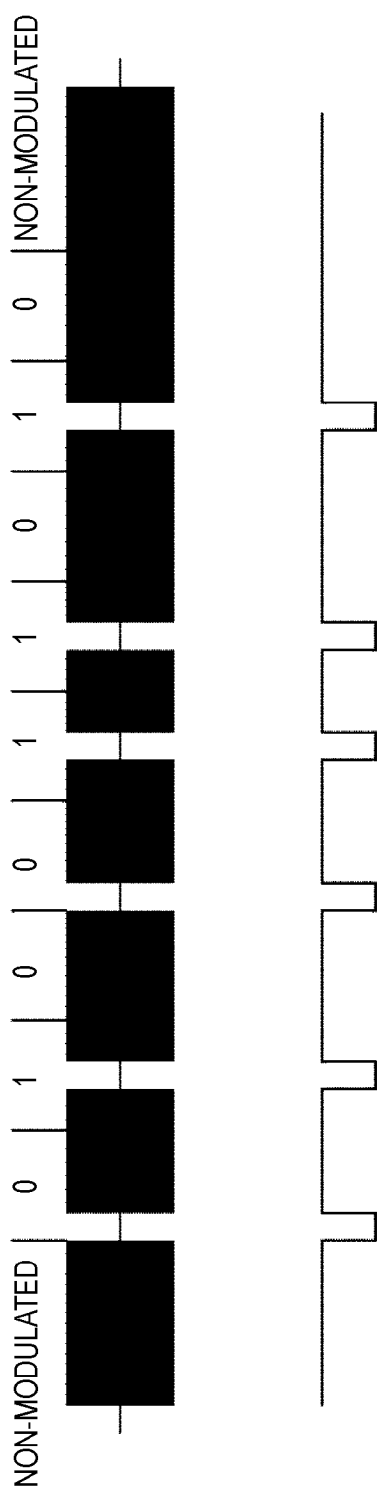
FIGS. 5A and 5B show a transmission waveform of Type A and an example of a demodulated signal obtained by binarization of the waveform.

FIGS. 5A and 5B show a transmission waveform when the data of the set of 9 bits (S,b1,b2,b3,b4,b5,b6,b7,E) is (0,1,0, 0,1,1,0,1,0) and a demodulated signal obtained by demodulation of the waveform.

FIG. 5A shows a transmission waveform transmitted from the reader writer when the data of the set of 9 bits (S,b1,b2, b3,b4,b5,b6,b7,E) is (0,1,0,0,1,1,0,1,0).

FIG. 5B shows the demodulated signal obtained by demodulation of the waveform in FIG. 5A with the modulated part as Lo and the non-modulated part as Hi.

Referring to FIG. 5B, it may be confirmed that the demodulated signal when the communication system is Type A has the ratio of the Hi period, i.e., the ratio of the non-modulated part equal to or more than 0.68 as described above.

Initial demodulated signal at start of communication of Type B

FIGS. 6A and 6B show a transmission waveform of the transmission signal first transmitted from the reader writer when the communication system is Type B, and a demodulated signal formed by demodulation of the waveform.

In Type B, as shown in FIG. 6A, SOF (Start of Frame) indicating the start of communication is first transmitted, and then, data is transmitted. The data part is indefinite and shown in gray like in FIG. 3.

The SOF is defined to have the period of 10 to 11 etu from the start as the logical "0", and the subsequent period of 2 to 3 etu as the logical "1" under a standard. Accordingly, the entire SOF period is 12 to 14 etu.

FIG. 6B shows the demodulated signal obtained by demodulation of the transmission waveform in FIG. 6A with the modulated part as Lo and the non-modulated part as Hi.

Referring to FIG. 6B, the demodulated signal when the communication system is Type B has a feature that the signal is at Lo in the period of at least 10 etu (94 μetu) from the start of communication.

Initial demodulated signal at start of communication of Type F.

Figures 7A, 7B:
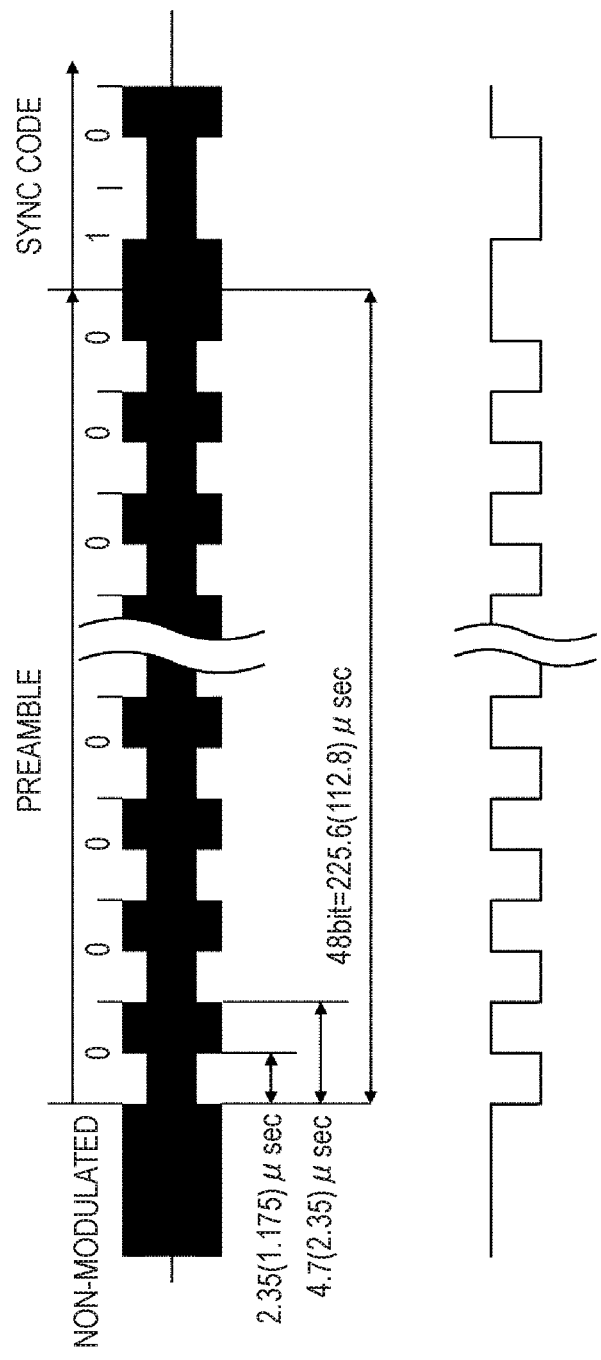
FIGS. 7A and 7B show a transmission waveform of Type F and an example of a demodulated signal obtained by binarization of the waveform.

FIGS. 7A and 7B show a transmission waveform of the transmission signal first transmitted from the reader writer when the communication system is Type F, and a demodulated signal formed by demodulation of the waveform.

In Type F, as shown in FIG. 7A, a preamble field including at least 48 bits of logical "0" is first transmitted from the reader writer. The logical "0" of Type F is expressed by a waveform having a modulated part in the first half and a non-modulated part in the second half of 1 etu. On the other hand, the logical "1" of Type F is expressed by a waveform having a modulated part in the second half and a non-modulated part in the first half of 1 etu.

After the preamble field, a Sync Code field, a length field, a payload field, a CRC (Cyclic Redundancy Checking) field are sequentially transmitted.

In Type F, when the communication rate is 212 kbps, 1 etu is about 4.7 μsec. On the other hand, when the communication rate is 424 kbps, 1 etu is about 2.35 μsec, a half of that in the case of 212 kbps.

Therefore, the entire period of the preamble field is about 225.6 μsec when the communication rate is 212 kbps, and about 112.8 μsec when the communication rate is 424 kbps.

FIG. 7B shows the demodulated signal obtained by demodulation of the waveform in FIG. 7A with the modulated part as Lo and the non-modulated part as Hi.

Referring to FIG. 7B, the demodulated signal when the communication system is Type F has a feature that the Hi period and the Lo period are equal at least in a period of about 112.8 μsec from the start of communication.

Determination method of communication system determination circuit 21

Next, a determination method when the communication system determination circuit 21 determines the communication system will be explained referring to FIG. 8.

Figure 8:
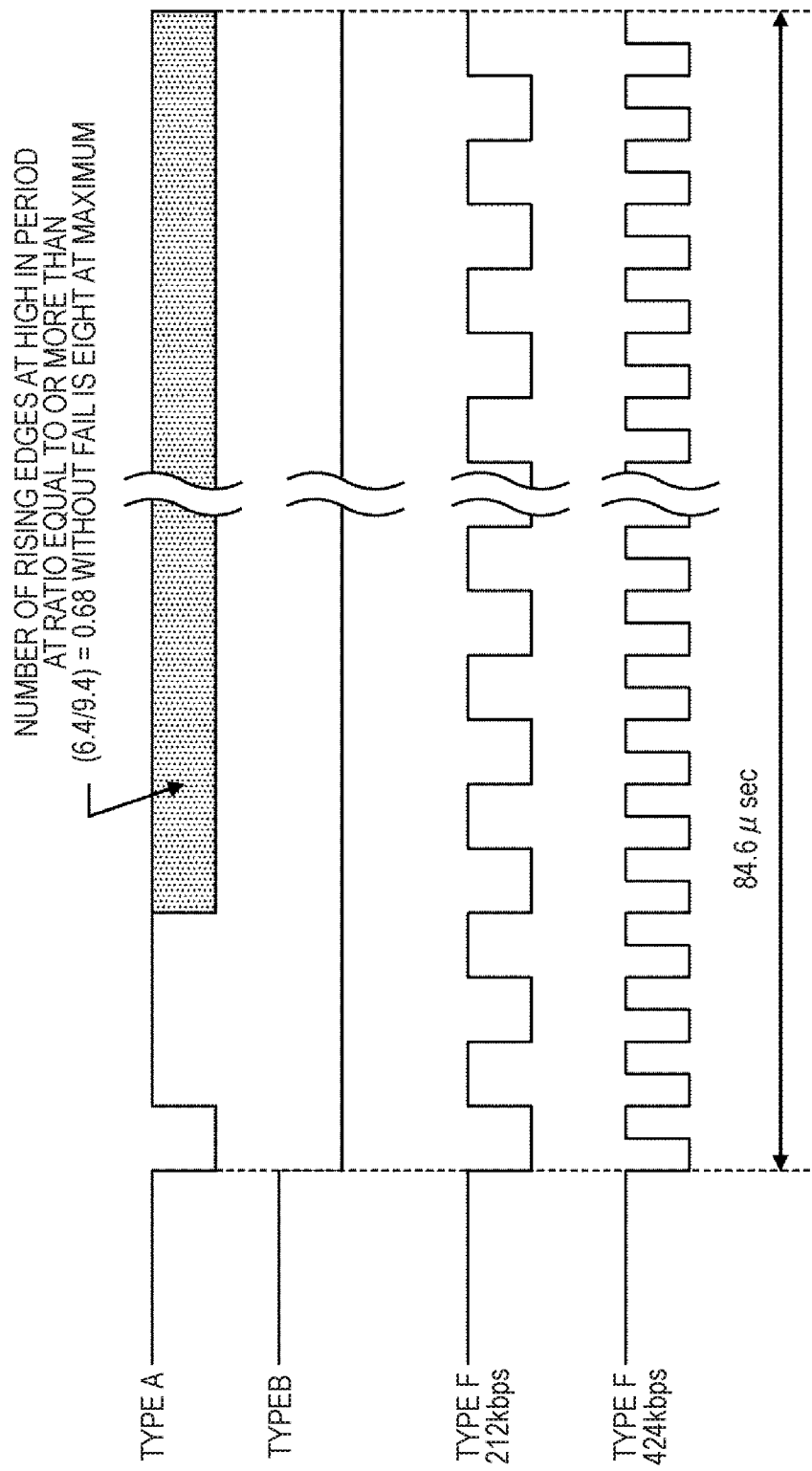
FIG. 8 collectively shows demodulated signals of Type A, Type B, and Type F.

FIG. 8 collectively shows the respective demodulated signals of Type A, Type B, and Type F that have been explained with reference to FIGS. 3 to 7B regarding the first period of 84.6 μsec from the start of communication.

The communication system determination circuit 21 determines the communication system as one of Type A, Type B, and Type F using one of a first determination method and a second determination method.

In the first determination method, determination focused on the ratio of the length of the Hi period in the demodulated signal in the period from the start of communication to 84.6 μsec is employed.

Accordingly, attention is focused on the lengths of the Hi periods of the respective communication systems in the demodulated signals shown in FIG. 8, and the ratio of the length of the Hi period when the communication system is Type F is 0.5 in both cases where the communication rate is 212 kbps and 424 kbps.

Further, the ratio of the length of the Hi period when the communication system is Type B is zero.

Furthermore, regarding the ratio of the length of the Hi period when the communication system is Type A, the period depending on the data shown in gray is equal to or more than 0.68 as described above, and it is clear that the rate is equal to or more than 0.68 even including the rest of the period.

As described above, a relationship that the ratios of the lengths of the Hi periods of the respective communication systems are larger in the order of Type A, Type F (communication rates: 424 kbps, 212 kbps), and Type B is constantly held. By detecting the differences between the ratios of the lengths of the Hi periods, the communication system can be determined as one of Type A, Type B, and Type F.

Note that, in the first determination method, it may be impossible to detect the difference between the communication rates of Type F. The difference is detected using another preexisting method.

On the other hand, in the second determination method, determination focused on the number of rising edges in the demodulated signal in the period from the start of communication to 84.6 μsec is employed.

Accordingly, attention is focused on the numbers of rising edges of the respective communication systems in the demodulated signals shown in FIG. 8. When the communication system is Type F at the communication rate of 424 kbps, one cycle is 2.35 μsec as shown in FIG. 7B, and the number of rising edges is 84.6 μsec/2.35 μsec=36.

Further, when the communication system is Type F at the communication rate of 212 kbps, one cycle is 4.7 μsec as shown in FIG. 7B, and the number of rising edges is 84.6 μsec/4.7 μsec=18.

Furthermore, the number of rising edges when the communication system is Type B is zero.

On the other hand, the number of rising edges when the communication system is Type A is eight at the maximum because the demodulated signals corresponding to FIG. 4A or 4B are eight continuous signals in the period depending on the data shown in gray. Further, one rising edge is produced before the period shown in gray, and one plus eight equals nine at the maximum.

As described above, a relationship that the numbers of rising edges of the respective communication systems are larger in the order of Type F at the communication rate of 424 kbps, Type F at the communication rate of 212 kbps, Type A, and Type B is constantly held. By detecting the differences between the numbers of rising edges, the communication system is determined as one of Type A, Type B, Type F of 212 kbps and Type F of 424 kbps.

Next, regarding the respective first determination method and second determination method, the detailed configurations of the communication system determination circuit 21 will be explained.

Figure 9:
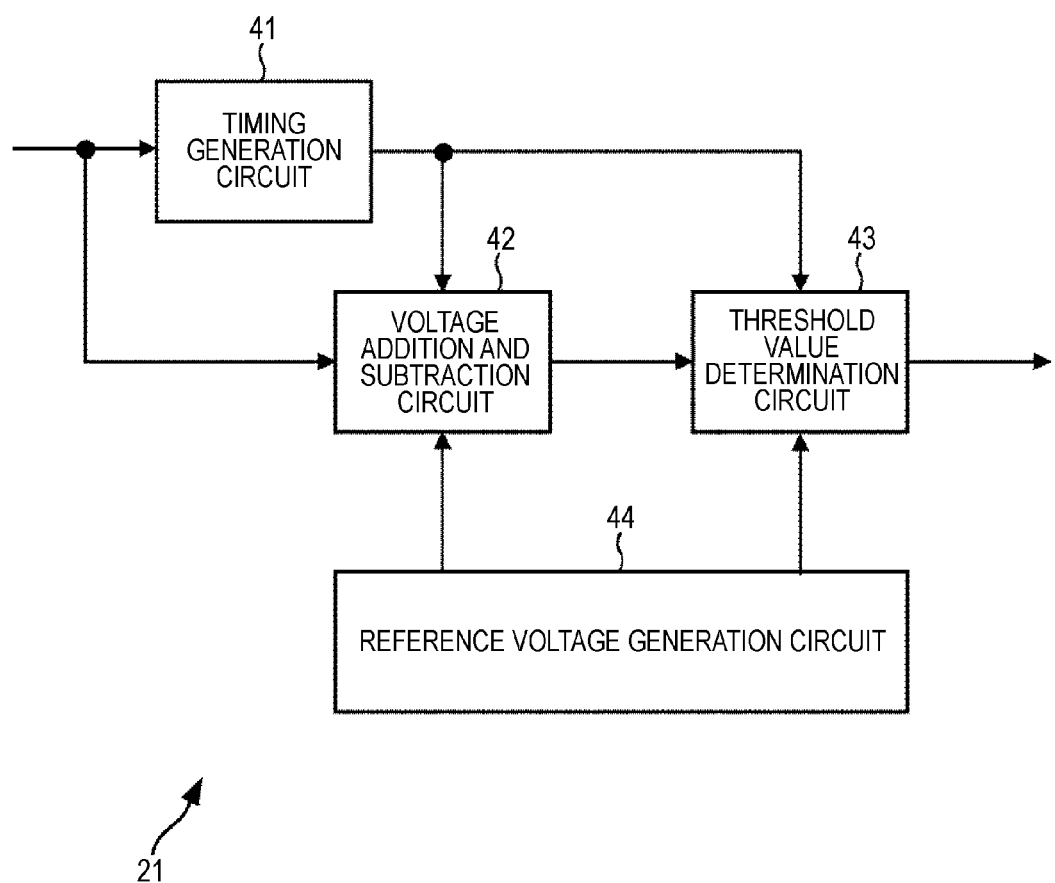
FIG. 9 is a block diagram showing a configuration example of a communication system determination circuit that performs a first determination method.

Configuration example of communication system determination circuit 21 that performs first determination method FIG. 9 is a block diagram showing a configuration example of the communication system determination circuit 21 that performs the first determination method.

The communication system determination circuit 21 in FIG. 9 includes a timing generation circuit 41, a voltage addition and subtraction circuit 42, a threshold value determination circuit 43, and a reference voltage generation circuit 44.

A demodulated signal is supplied from the reception circuit 22 to the timing generation circuit 41. Further, also a reference clock is supplied from the clock generation circuit 24 to the timing generation circuit 41.

The timing generation circuit 41 generates a determination timing pulse representing whether a period is the period from the start of communication to 84.6 μsec or not based on the demodulated signal and the reference clock, and supplies the pulse to the voltage addition and subtraction circuit 42 and the threshold value determination circuit 43. Specifically, the timing generation circuit 41 generates a determination timing pulse to provide a Hi signal in the period from the start of communication to 84.6 μsec and a Lo signal in other periods.

The demodulated signal is supplied from the reception circuit 22 and the determination timing pulse is supplied from the timing generation circuit 41 to the voltage addition and subtraction circuit 42. The voltage addition and subtraction circuit 42 performs processing of charging or discharging the reference voltage supplied from the reference voltage generation circuit 44 according to the logical value of the demodulated signal only with respect to the period in which the determination timing pulse is Hi. That is, the voltage addition and subtraction circuit 42 performs addition of the reference voltage supplied from the reference voltage generation circuit 44 when the determination timing pulse is Hi and the demodulated signal is Hi, and performs subtraction of the reference voltage when the determination timing pulse is Hi and the demodulated signal is Lo.

The voltage addition and subtraction circuit 42 supplies the addition and subtraction result (the voltage value) of the reference voltage to the threshold value determination circuit 43 at the time when the determination timing pulse becomes Lo, i.e., at the time after a lapse of 84.6 μsec from the start of communication.

The threshold value determination circuit 43 generates a threshold voltage for comparison with the addition and subtraction result from the voltage addition and subtraction circuit 42 using the reference voltage supplied from the reference voltage generation circuit 44. Then, the threshold value determination circuit 43 compares the addition and subtraction result supplied from the voltage addition and subtraction circuit 42 with the generated threshold voltage at the time when the determination timing pulse becomes Lo, and thereby, determines the communication system as one of Type A, Type B, and Type F. The threshold value determination circuit 43 supplies the determination result to the reception circuit 22, the transmission circuit, and the data processing circuit 26 (FIG. 2). Note that setting of the threshold voltage for comparison with the addition and subtraction result will be described later by referring to FIG. 15.

The reference voltage generation circuit 44 generates a reference voltage for the voltage addition and subtraction circuit 42 to perform addition and subtraction, and supplies the voltage to the voltage addition and subtraction circuit 42. Further, the reference voltage generation circuit 44 supplies the reference voltage for generation for the threshold voltage to the threshold value determination circuit 43.

Example of addition and subtraction result according to first determination method.

Figure 10:
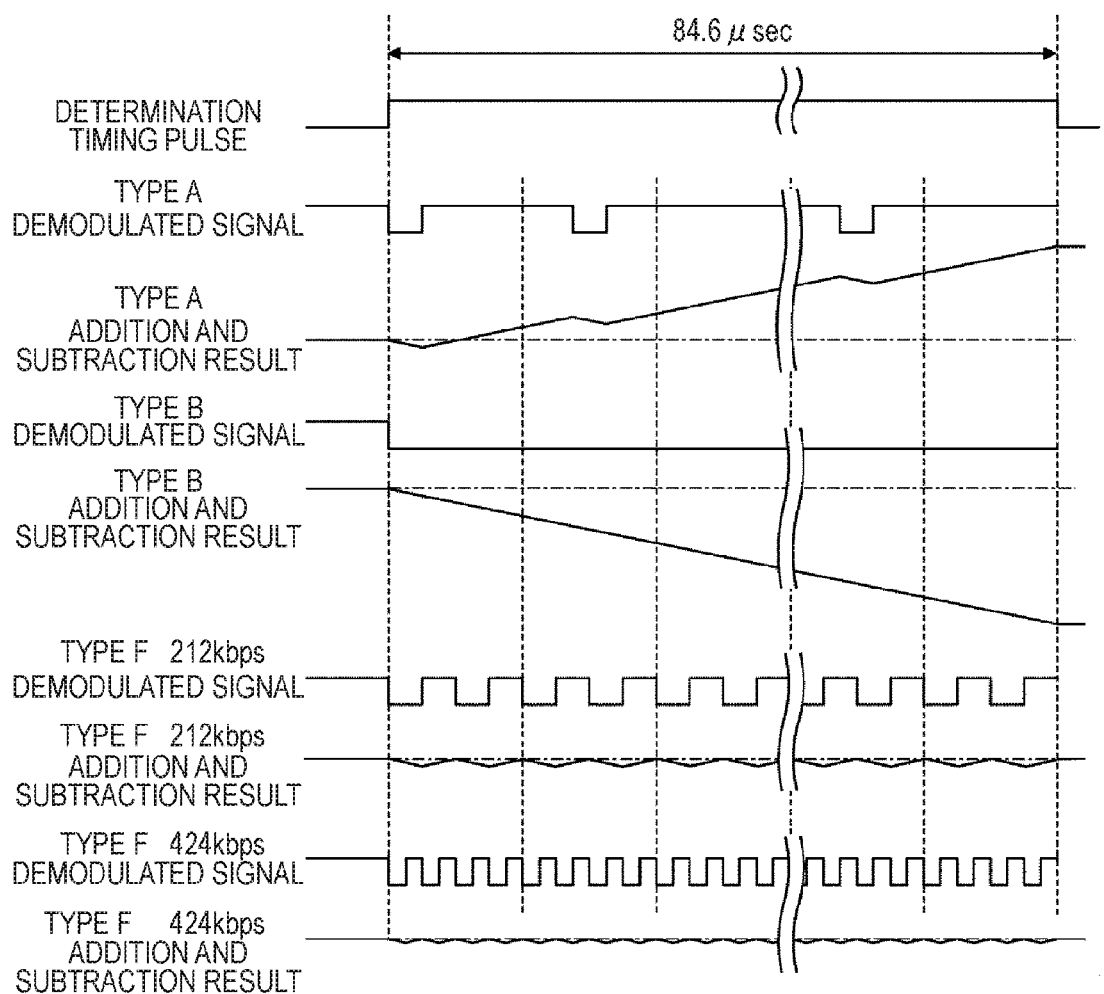
FIG. 10 simply shows an example of addition and subtraction results according to the first determination method of the respective communication systems.

FIG. 10 simply shows an example of addition and subtraction results according to the first determination method of the respective communication systems of Type A, Type B, and Type F.

When the communication system is Type A, the demodulated signal is Hi at the ratio equal to or more than 0.68, and the addition and subtraction result at the time after a lapse of 84.6 μsec from the start of communication is a positive large value.

When the communication system is Type B, the ratio of the length of the Hi period is zero and the demodulated signal is constantly Lo, and the addition and subtraction result at the time after a lapse of 84.6 μsec from the start of communication is a negative large value.

When the communication system is Type F, the ratio of the length of the Hi period is 0.5, and the addition and subtraction result at the time after a lapse of 84.6 μsec from the start of communication is nearly zero.

As described above, there is a relationship that the ratios of the lengths of the Hi periods are larger in the order of Type A, Type F, and Type B, and correspondingly, the addition and subtraction results (voltages) have a relationship to be larger in the order of Type A, Type F, and Type B.

Therefore, by discriminating the value of the addition and subtraction result at the time after a lapse of 84.6 μsec from the start of communication using the threshold value, the communication system can be determined.

Flowchart of first determination processing

Figure 11:
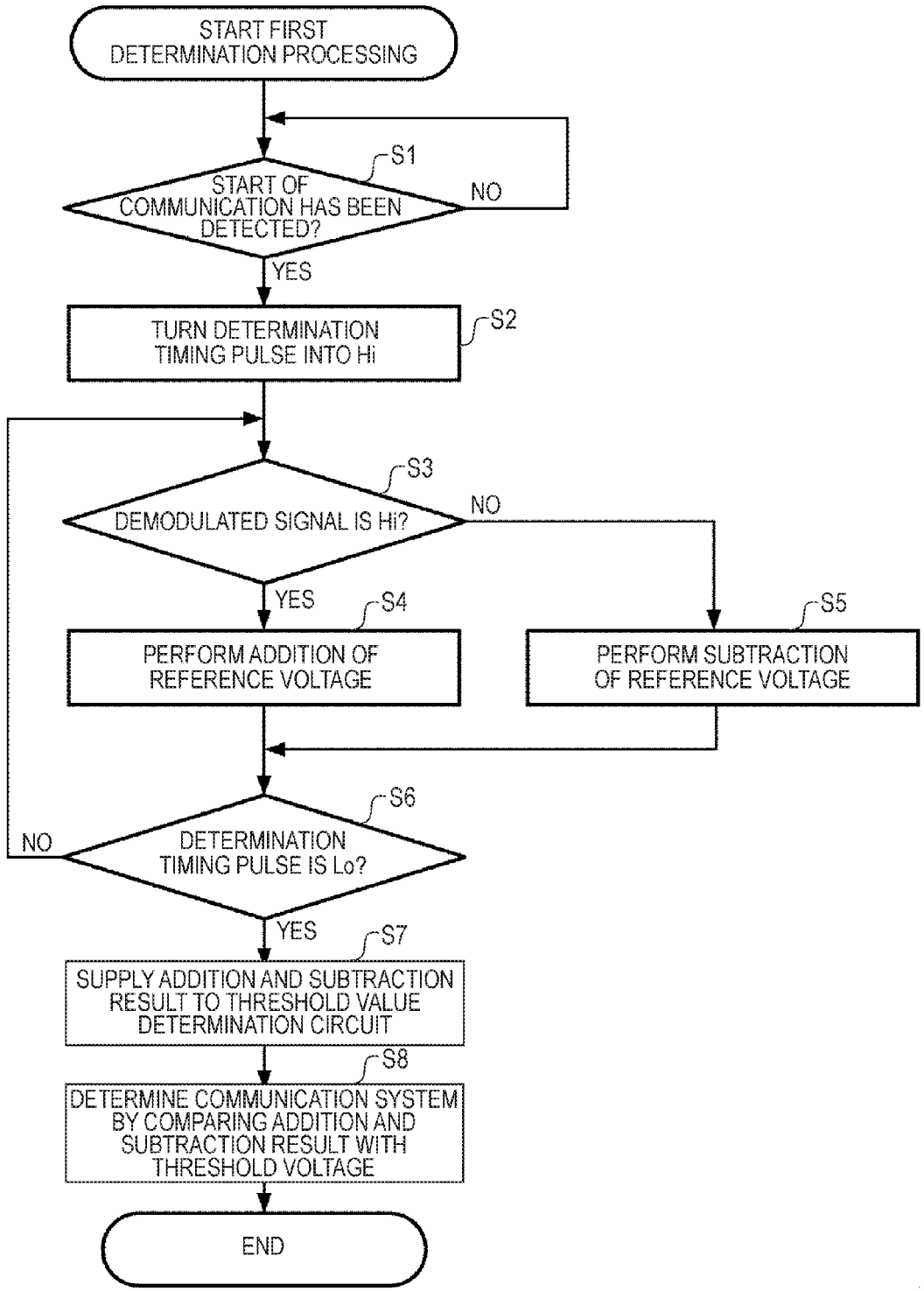
FIG. 11 is a flowchart for explanation of first determination processing.

First determination processing performed by the communication system determination circuit 21 in FIG. 9 using the first determination method will be explained with reference to FIG. 11.

First, at step S1, the timing generation circuit 41 determines whether to have detected the start of communication or not based on the demodulated signal supplied from the reception circuit 22, and waits until detection of the start of communication is determined. At step S1, in the case where power is generated from the electromagnetic wave supplied from the reader writer, the IC card 1 is activated, and then, the timing generation circuit 41 detects the first rise of the demodulated signal, the timing generation circuit 41 determines to have detected the start of communication.

If the determination that the start of communication has been detected is made at step S1, the timing generation circuit 41 turns the determination timing pulse supplied to the voltage addition and subtraction circuit 42 and the threshold value determination circuit 43 to Hi at step S2. The determination timing pulse that has been turned to Hi is turned to Lo after 84.6 μsec has been counted from the start of communication and 84.6 μsec has elapsed from the start of communication.

At step S3, the voltage addition and subtraction circuit 42 determines whether the demodulated signal supplied from the reception circuit 22 has become Hi or not.

At step S3, if the determination that the demodulated signal has become Hi is made, the process moves to step S4, and the voltage addition and subtraction circuit 42 performs addition of the reference voltage supplied from the reference voltage generation circuit 44.

On the other hand, at step S3, if the determination that the demodulated signal has become Lo is made, the process moves to step S5, and the voltage addition and subtraction circuit 42 performs subtraction of the reference voltage supplied from the reference voltage generation circuit 44.

After the processing at step S4 or S5, at step S6, the voltage addition and subtraction circuit 42 determines whether the determination timing pulse is Lo or not. At step S6, if the determination that the determination timing pulse is not Lo (is Hi) is made, the process returns to step S3, and the above described processing at steps S3 to S6 is repeated.

On the other hand, at step S6, if the determination that the determination timing pulse is Lo is made, the process moves to step S7, and the voltage addition and subtraction circuit 42 supplies the addition and subtraction result (the voltage value) of the reference voltage to the threshold value determination circuit 43.

At step S8, the threshold value determination circuit 43 compares the addition and subtraction result supplied from the voltage addition and subtraction circuit 42 with the threshold voltage, determines the communication system, and terminates the processing. That is, which one of Type A, Type B, and Type F the communication system is determined, and the determination result is supplied from the threshold value determination circuit 43 to the reception circuit 22, the transmission circuit 23, and the data processing circuit 26, and the process ends.

As described above, in the first determination processing, the communication system is determined based on the result obtained by conversion of the ratio of the length of the period of the predetermined logical value of the logical values of the demodulated signals in the period from the start of communication to predetermined timing (until the determination timing pulse becomes Lo) into the voltage value.

Note that, in the above described example, addition of the reference voltage is performed when the demodulated signal is Hi, and subtraction of the reference voltage is performed when the demodulated signal is Lo. However, as long as the consistency with the threshold voltage generated in the threshold value determination circuit 43 is held, the relationship between the logical value (polarity) of the demodulated signal and the addition and subtraction of the reference voltage may be reversed.

Configuration example of communication system determination circuit 21 that performs second determination method.

Figure 12:
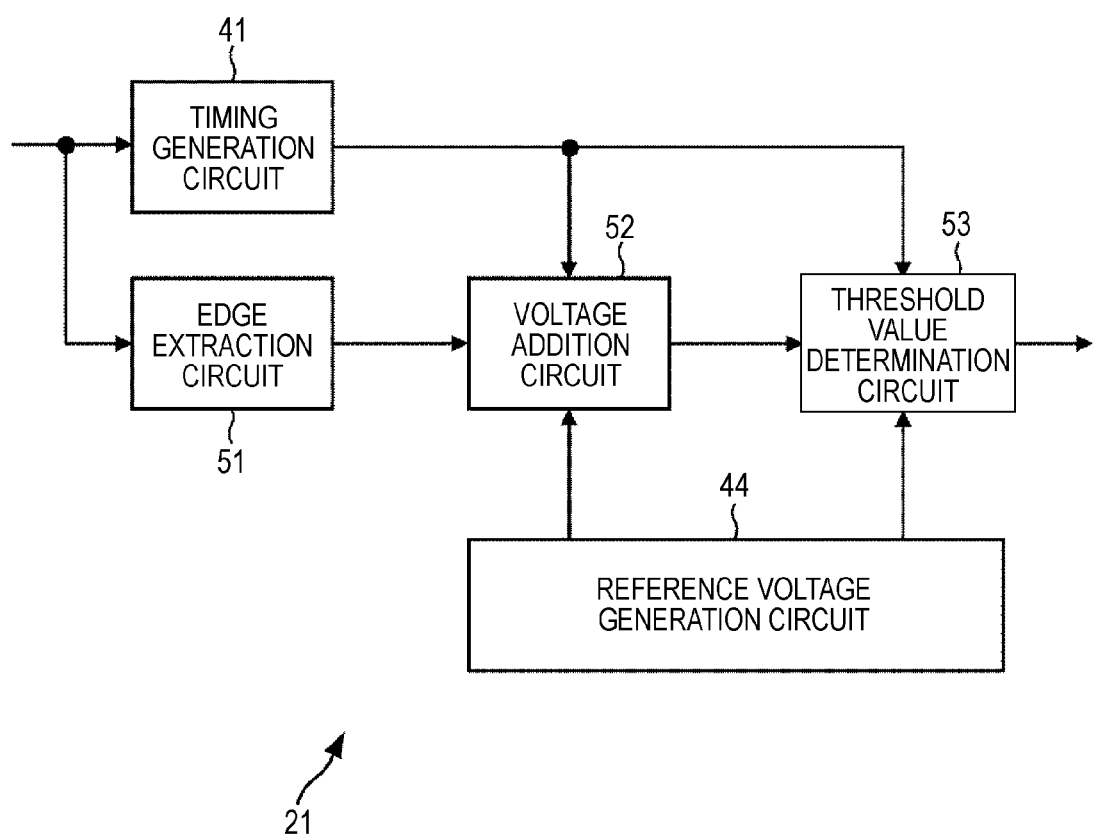
FIG. 12 is a block diagram showing a configuration example of a communication system determination circuit that performs a second determination method.

FIG. 12 is a block diagram showing a configuration example of the communication system determination circuit 21 that performs the second determination method.

The communication system determination circuit 21 in FIG. 12 determines a communication system by performing addition of the reference voltage according to the number of rising edges as switching points of the logical values of the demodulated signal supplied from the reception circuit 22, and comparing the addition result with a threshold voltage.

The communication system determination circuit 21 in FIG. 12 includes a timing generation circuit 41, an edge extraction circuit 51, a voltage addition circuit 52, a threshold value determination circuit 53, and a reference voltage generation circuit 44. The timing generation circuit 41 and the reference voltage generation circuit 44 are the same as those in FIG. 9, and the explanation thereof will be omitted.

The edge extraction circuit 51 extracts rising edges of the demodulated signal supplied from the reception circuit 22 and supplies the results to the voltage addition circuit 52. Specifically, when extracting a rising edge, the edge extraction circuit 51 supplies a rising edge extraction pulse at Hi in a fixed period to the voltage addition circuit 52.

In the period when the determination timing pulse is Hi and the signal indicating the extraction of the rising edge is supplied from the edge extraction circuit 51, the voltage addition circuit 52 performs addition (charging) of the reference voltage supplied from the reference voltage generation circuit 44. Specifically, in the period when the determination timing pulse is Hi and the rising edge extraction pulse is also Hi, the voltage addition circuit 52 performs addition of the reference voltage. Then, at the time when the determination timing pulse becomes Lo, the voltage addition circuit 52 supplies the addition results that have been obtained to the threshold value determination circuit 53.

The threshold value determination circuit 53 generates a threshold voltage for comparison with the addition result from the voltage addition circuit 52 using the reference voltage supplied from the reference voltage generation circuit 44. Further, the threshold value determination circuit 53 compares the addition result supplied from the voltage addition circuit 52 with the generated threshold voltage at the time when the determination timing pulse becomes Lo, and thereby, determines the communication system as one of Type A, Type B, and Type F. Note that the threshold voltage for comparison with the addition result is different from that in the case of the first determination method. The threshold value determination circuit 53 supplies the determination result to the reception circuit 22, the transmission circuit 23, and the data processing circuit 26 (FIG. 2). Note that setting of the threshold voltage for comparison with the addition result will be described later by referring to FIG. 16.

Example of addition and subtraction result according to second determination method.

Figure 13:
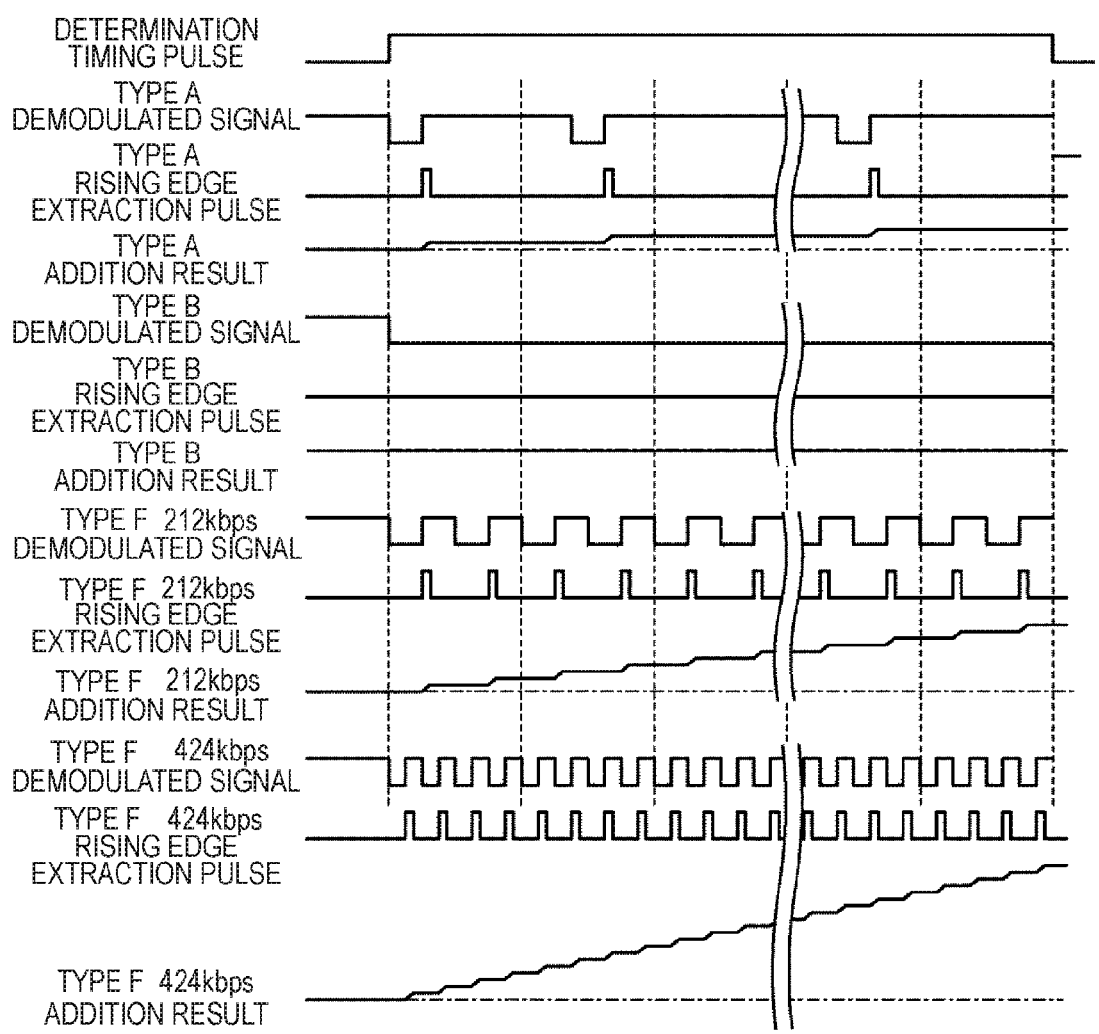
FIG. 13 simply shows an example of addition and subtraction results according to the second determination method of the respective communication systems.

FIG. 13 simply shows an example of addition results according to the second determination method of the respective communication systems of Type A, Type B, and Type F.

When the communication system is Type A, the number of rising edges is nine at the maximum. FIG. 13 shows an example of the number of rising edges of three. In this case, the rising edge extraction pulse becomes Hi at three times and the predetermined reference voltage is added at each time.

When the communication system is Type B, the number of rising edges is zero, and the rising edge extraction pulse does not become Hi even once. Therefore, the addition result remains zero.

When the communication system is Type F of 424 kbps, the number of rising edges is 36. The rising edge extraction pulse becomes Hi at 36 times, and the predetermined reference voltage is added at each time.

When the communication system is Type F of 212 kbps, the number of rising edges is 18. The rising edge extraction pulse becomes Hi at 18 times, and the predetermined reference voltage is added at each time.

As described above, there is a relationship that the numbers of rising edges are larger in the order of Type F of 424 kbps, Type F of 212 kbps, Type A, and Type B, and corresponding to the numbers of rising edges, the addition results (voltages) have a relationship to be larger in the order of Type F of 424 kbps, Type F of 212 kbps, Type A, and Type B.

Therefore, by discriminating the value of the addition result at the time after a lapse of 84.6 μsec from the start of communication using the threshold value, the communication system can be determined.

In the above described example, the rising edges are extracted, however, as long as the consistency with the threshold voltage generated in the threshold value determination circuit 53 is held, the same processing can be performed even when the rising edges are extracted. That is, the communication system can be determined by converting the numbers of switching of the logical values of the demodulated signal into voltages.

Flowchart of second determination processing.

Figure 14:
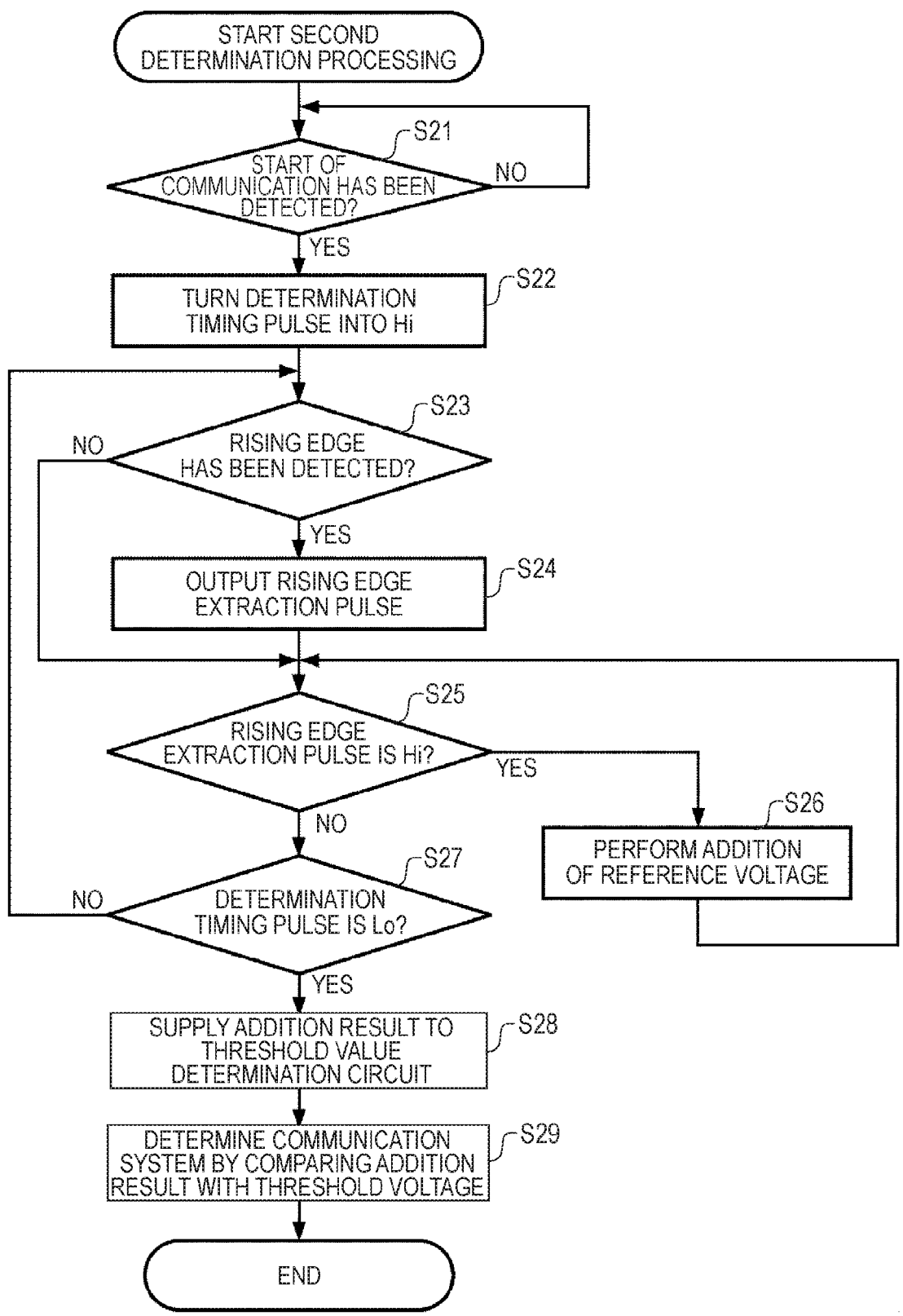
FIG. 14 is a flowchart for explanation of second determination processing.

Second determination processing performed by the communication system determination circuit 21 in FIG. 12 using the second determination method will be explained with reference to FIG. 14.

First, at step S21, the timing generation circuit 41 determines whether to have detected the start of communication or not based on the demodulated signal supplied from the reception circuit 22, and waits until detection of the start of communication has been determined. At step S21, if the determination that the start of communication has been detected is made, the timing generation circuit 41 turns the determination timing pulse into Hi at step S22. The processing at steps S21 and S22 is the same as that at steps S1 and S2 in the above described first determination processing.

At step S23, the edge extraction circuit 51 determines whether to have detected the rising edge of the demodulated signal supplied from the reception circuit 22 or not. At step S23, if the determination that the rising edge has been detected is made, the process moves to step S24, and the edge extraction circuit 51 outputs the rising edge extraction pulse at Hi in the fixed period to the voltage addition circuit 52.

On the other hand, at step S23, if the determination that the rising edge has not been detected is made, the step S24 is skipped and the process moves to step S25.

At step S25, the voltage addition circuit 52 determines whether the rising edge extraction pulse is Hi or not. If the determination that the rising edge extraction pulse is Hi is made at step S25, the process moves to step S26, and the voltage addition circuit 52 performs addition of the reference voltage supplied from the reference voltage generation circuit 44. After step S26, the process returns to step S25.

The processing at step S24 and the processing at steps S25 and S26 are executed in parallel. As a result, while the rising edge extraction pulse is Hi, the addition of the reference voltage by the voltage addition circuit 52 is continued.

On the other hand, if the determination that the rising edge extraction pulse is not Hi is made at step S25, the process moves to step S27, and the voltage addition circuit 52 determines whether the determination timing pulse is Lo or not. At step S27, if the determination that the determination timing pulse is not Lo (is Hi) is made, the process returns to step S23, and the above described processing at steps S23 to S27 is repeated.

On the other hand, at step S27, if the determination that the determination timing pulse is Lo is made, the process moves to step S28, and the voltage addition circuit 52 supplies the addition result of the reference voltage to the threshold value determination circuit 53.

At step S29, the threshold value determination circuit 53 compares the addition result supplied from the voltage addition circuit 52 with the threshold voltage, determines the communication system, and terminates the processing. That is, which one of Type A, Type B, and Type F the communication system is determined, and the determination result is supplied from the threshold value determination circuit 43 to the reception circuit 22, the transmission circuit 23, and the data processing circuit 26, and the process ends.

As described above, in the second determination processing, the communication system is determined based on the result obtained by conversion of the number of switching of the logical values of the demodulated signal in the period from the start of communication to predetermined timing (until the determination timing pulse becomes Lo) into the voltage value.

Setting range of determination timing and threshold value in first determination processing.

Next, settable ranges of the determination timing and the threshold voltage in the first determination processing will be explained by referring to FIG. 15.

First, the settable range of the determination timing will be explained.

A range in which the addition and subtraction results by the voltage addition and subtraction circuit 42 have a relationship to be larger in the order of Type A, Type F, and Type B may be employed as the range of the determination timing.

Regarding the lower limit of the settable determination timing, in Type A, the ratio of the length of the Hi period is equal to or more than 0.68 without fail, and the addition and subtraction result constantly rises from the start of communication. In Type F of 212 kbps, the ratio of the length of the Hi period is 0.5, and the addition and subtraction result constantly becomes nearly zero. Type F of 424 kbps is the same as in the case of the communication rate of 212 kbps, and the explanation and illustration thereof will be omitted.

In Type B, as has been explained by referring to FIGS. 6A and 6B, in the period of at least 10 etu (94 μsec) from the start of communication, the signal is at Lo, and the addition and subtraction result constantly drops from the start of communication to 10 etu.

Therefore, at the time after a lapse of 1 etu from the start of communication, the relationship that the addition and subtraction results are larger in the order of Type A, Type F, and Type B is held without fail.

As described above, the lower limit of the settable determination timing is at the time after a lapse of 1 etu from the start of communication.

Next, the upper limit of the settable determination timing will be explained.

The addition and subtraction result of Type A constantly rises from the start of communication, and the result of Type F is constantly nearly zero.

On the other hand, Type B is transmitted in formats of SOF, character, and EOF (End Of Frame), and the signal in the last 2 to 3 etu of the SOF is the demodulated signal at Hi as shown in FIG. 6B. Further, when the signal is the demodulated signal at Hi due to the character subsequent to the SOF, the addition and subtraction result is added to the value that has been obtained and the signal gradually rises. As a result, at the time when the addition and subtraction result is nearly zero as in Type F, it may be impossible to make determination as to whether Type B or Type F. Therefore, the time when the addition and subtraction result first becomes nearly zero after 10 etu from the start of communication is the upper limit of the settable determination timing.

The addition and subtraction result first becomes nearly zero when the entire demodulated signal of Type B becomes Hi. The demodulated signal of Type B in FIG. 15 shows a signal which the entire demodulated signal of Type B becomes Hi after 10 etu from the start of communication. Note that the demodulated signal of Type B is Lo in a period of 1 etu at 13 etu from the start of communication because the start bit of the character after the SOF is fixed to logical "0".

Figure 15:
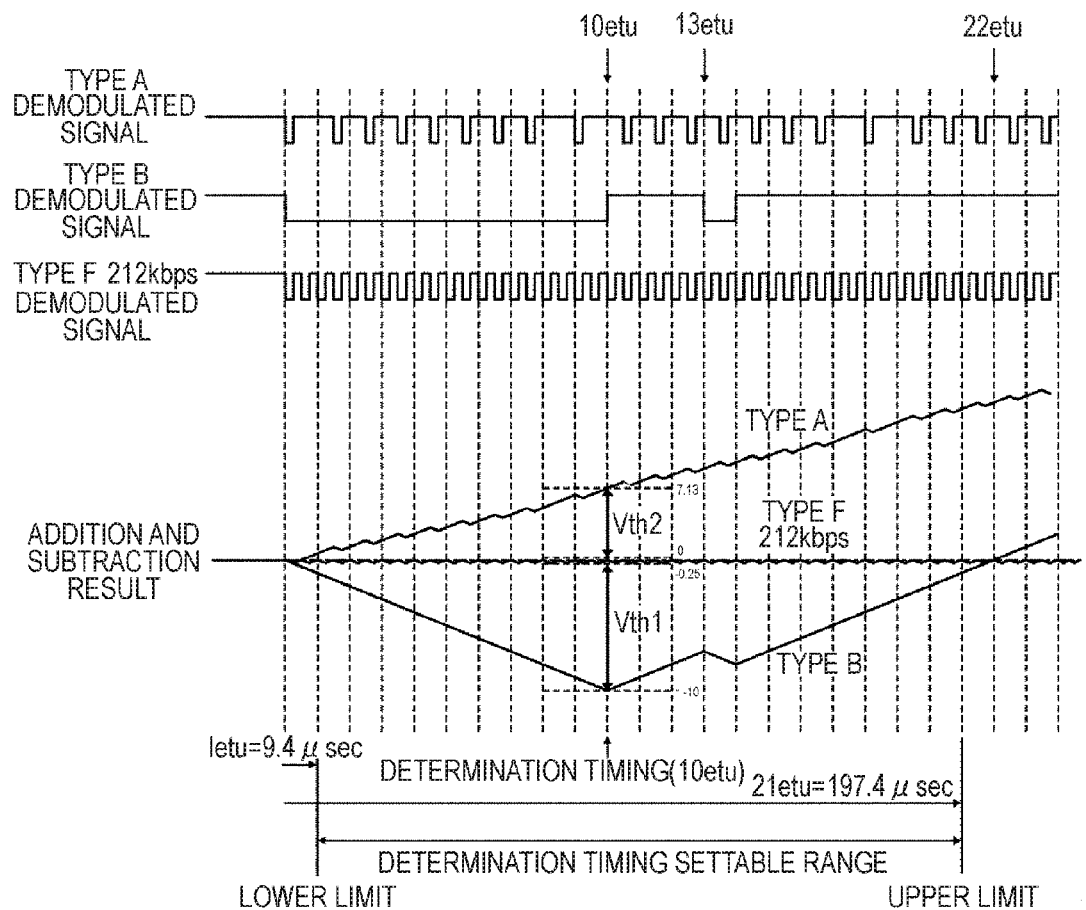
FIG. 15 is a chart for explanation of setting ranges of determination timing and threshold values in the first determination processing.

According to the demodulated signal of Type B shown in FIG. 15, the addition and subtraction result gradually rises after 10 etu from the start of communication, and becomes zero at the time after a lapse of 22 etu from the start of communication. Therefore, the lower limit of the settable determining timing is at the time after a lapse of 21 etu from the start of communication (after 197.4 μsec from the start of communication) 1 etu before the time after a lapse of 22 etu from the start of communication at which the addition and subtraction result becomes zero.

As described above, the setting range of the determination timing may be from the time after a lapse of 1 etu from the start of communication to the time after a lapse of 22 etu from the start of communication. That is, the setting range of the determination timing is from the time after 9.4 μsec from the start of communication to the time after 197.4 μsec.

Next, a method of deciding the threshold voltage in the first determination processing will be explained.

As an example, the case where the threshold voltage is decided when the determination is made at the time after a lapse of 10 etu from the start of communication will be explained. Further, it is assumed that the voltage value when the voltage addition and subtraction circuit 42 performs addition of the reference voltage is +1 and the voltage value when the circuit performs subtraction is −1 during 1 etu.

Since the demodulated signal of Type B in the period from the start of communication to 10 etu becomes Lo without fail, the subtraction of −1 continues in the period of 10 etu. Therefore, the addition and subtraction result at the time of determination after a lapse of 10 etu from the start of communication becomes −10.

In Type F in the period from the start of communication to 10 etu, the Lo demodulated signal in the period of 0.25 etu, the Hi demodulated signal in the period of 0.25 etu, the Lo demodulated signal in the period of 0.25 etu, and the Hi demodulated signal in the period of 0.25 etu are repeated. In other words, in Type F in the period from the start of communication to 10 etu, subtraction of −0.25, addition of 0.25, subtraction of −0.25, and addition of 0.25 are repeated. Therefore, the addition and subtraction result at the time of determination after a lapse of 10 etu from the start of communication becomes 0 (in a range from −0.25 to 0).

The demodulated signal of Type A in the period from the start of communication to 10 etu is not uniquely decided because it varies depending on data. Accordingly, at the time of 10 etu from the start of communication, an addition and subtraction result of the demodulated signal corresponding to the data closest to the addition and subtraction result of Type F is assumed.

The addition and subtraction result becomes closest to that of Type F when the logical "0" and the logical "1" of Lo in 3 μsec and Hi in 6.4 μsec at the maximum continue in the period of 10 etu. Note that the first command of Type A is defined to have 7 bits of odd parity, and thus, it is certain that the demodulated signal is Hi in the period of 1 etu of the period from the start of communication to 10 etu. Therefore, the demodulated signal is Hi in the period of (6.4/9.4)×9 etu+ (9.4/9.4)×1 etu=7.13 etu, and the demodulated signal is Lo in the rest period of 10−7.13=2.87 etu. As a result, the addition and subtraction result at the determination timing after a lapse of 10 etu from the start of communication is 7.13.

As described above, at the determination timing after a lapse of 10 etu from the start of communication, when the communication system is Type A, the addition and subtraction result is supposed to be equal to or more than 7.13. Further, when the communication system is Type F, the addition and subtraction result is supposed to be within a range from −0.25 to 0. Furthermore, when the communication system is Type B, the addition and subtraction result is supposed to be −10.

Therefore, the threshold value determination circuit 43 can set the first threshold voltage Vth1 in a range from −10 to −0.25 and set the second threshold voltage Vth2 in a range from 0 to 7.13. Further, the threshold value determination circuit 43 can determine the communication system by comparing the threshold voltages Vth1 and Vth2 with the addition and subtraction result supplied from the voltage addition and subtraction circuit 42.

Setting range of determination timing and threshold voltage in second determination processing.

Next, settable ranges of the determination timing and the threshold voltage in the second determination processing will be explained by referring to FIG. 16.

In the second determination processing, the basic concept is the same as that of the first determination processing. The second determination processing is different in that subtraction is not performed but only addition is performed and the addition is performed only while the edge extraction pulse is Hi.

As described above, a relationship that the number of rising edges and the addition results are larger in the order of Type F of 424 kbps, Type F of 212 kbps, Type A, and Type B is supposed to be held.

In Type A, there is a part that changes depending on the data in the part shown in gray in FIG. 3. Accordingly, as the demodulated signal of Type A, a demodulated signal in the maximum case where the largest number of rising edges are extracted and a demodulated signal in the minimum case where the smallest number of rising edges are extracted depending on the data are considered.

In Type B, the demodulated signal in the period of SOF is fixed, but the subsequent signal changes depending on the data. Therefore, in Type B, there are both the maximum case and the minimum case depending on the data like in Type A, however, the addition results are the least among the respective communication systems in Type B, and thus, only the maximum case may be considered for determination of the respective communication systems.

Similarly, in Type F, the demodulated signal of the preamble field is fixed, but the subsequent signal changes depending on the data. However, Type F employs the Manchester method as the coding method, and thus, the demodulated signal is fixed in a sense that the signal is independent of data and there is a rising edge in the period of 1 etu without fail.

Figure 16:
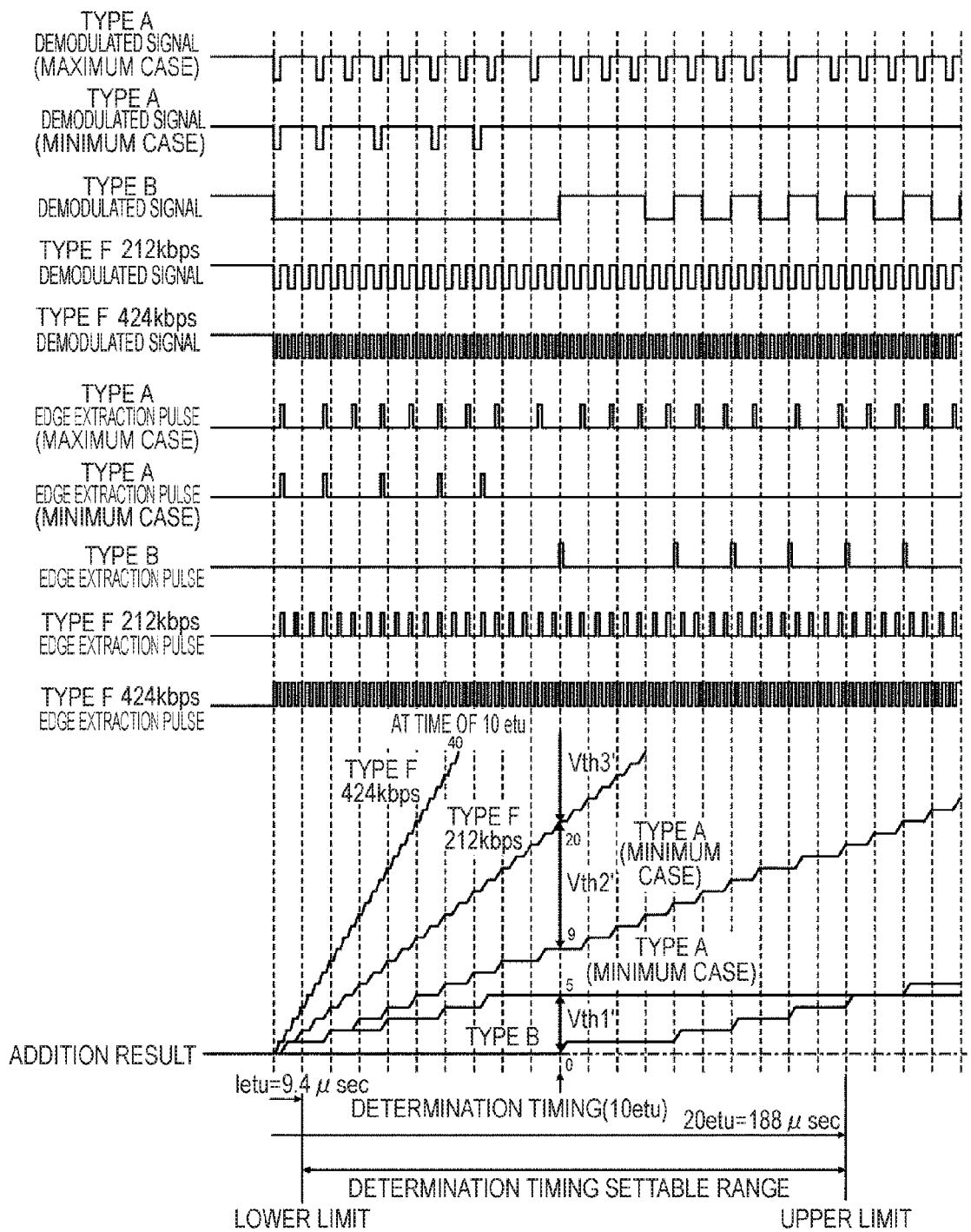
FIG. 16 is a chart for explanation of setting ranges of determination timing and threshold values in the second determination processing.

The respective demodulated signals of Type A, Type B, Type F of 212 kbps, and Type F of 424 kbps assumed as described above and the corresponding rising edge extraction pulses are shown in the upper part of FIG. 16.

Further, the addition results according to the rising edge extraction pulses are shown in the lower part of FIG. 16. Here, the addition results are calculated with the voltage value when addition of the reference voltage is performed in the period of 1 etu as +1.

The lower limit of the settable determination timing is at the time after a lapse of 1 etu from the start of communication as is the case of the first determination processing.

On the other hand, regarding the upper limit of the settable determination timing, at the time after a lapse of 21 etu from the start of communication, it is impossible to make determination because the addition result of Type B becomes the same as the addition result of Type A. Therefore, the upper limit of the settable determination timing is at the time after a lapse of 20 etu from the start of communication 1 etu before the time after a lapse of 21 etu from the start of communication.

As described above, the setting range of the determination timing may be from the time after a lapse of 1 etu from the start of communication to the time after a lapse of 22 etu from the start of communication. That is, the setting range of the determination timing is from the time after 9.4 μsec from the start of communication to the time after 188 μsec.

Next, a method of deciding the threshold voltage in the second determination processing will be explained.

Like the example of the first determination processing, in the case where the determination timing is set to the time after a lapse of 10 etu from the start of communication, when the communication system is Type B, the addition result is supposed to be zero. When the communication system is Type A, the addition result is five in the minimum case and nine in the maximum case. Further, in Type F of 212 kbps, the addition result is 20, and, in Type F of 424 kbps, the addition result is 40.

Therefore, the threshold value determination circuit 53 can set the first threshold voltage Vth1' in a range from 0 to 5, set the second threshold voltage Vth2' in a range from 9 to 20, and set the third threshold voltage Vth3' in a range from 20 to 40. Further, the circuit can determine the communication system by comparing these threshold voltages Vth1', Vth2', and Vth3' with the addition and subtraction result.

As described above, the threshold voltage is decided from the maximum value and the minimum value of the calculation results (addition and subtraction results or addition results) of the respective communication systems at the determination timing. Further, the determination timing may be set to timing at which the maximum value and the minimum value of the calculation results of the respective communication systems do not overlap.

Note that, in consideration of noise or the like contained in the reception signal, it is desirable that the determination timing is set to the time when there are large differences among the addition and subtraction results or the addition results of Type A, Type F, and Type B. Alternatively, it is desirable that the threshold voltage is set to a value as far away as possible from the ranges of the addition and subtraction results or the addition results of Type A, Type F, and Type B can take.

As described above, the IC card 1 in FIG. 1 determines the communication system of the transmission signal transmitted by the reader writer among the plural communication systems that the card itself can support by performing the first determination processing or the second determination processing. Then, the IC card 1 can perform noncontact communication by responding in the communication system as the determination result.

According to the determination method of the embodiment, it is not necessary to provide reception circuits respectively corresponding to the plural communication systems, and the communication system of the reader writer can be determined and communication can be established in the same time as that in the case of a single communication system. That is, according to the IC card 1, communication can be established with the simple configuration in the same time (short time) as that in the case of a single communication system with respect to the plural communication systems. Further, since it is not necessary to provide reception circuits respectively corresponding to the plural communication systems, the IC card 1 can be manufactured at low cost.

Further, as in the invention disclosed in JP-A-2004-200117, it is not necessary to perform special processing at a high speed, and thus, the power consumption is not increased. Therefore, there is no concern about reduction of the performance of wireless communication due to increase in power consumption.

Note that, in the above described examples, the examples of determination of Type A, Type B, Type F of 212 kbps, and Type F of 424 kbps have been explained, however, the first determination processing or the second determination processing can be applied to other communication systems. That is, when attention is focused on the length of the Hi period or the numbers of rising edges of the demodulated signals of the respective communication systems, the processing can be applied to the communication systems having differences thereof.

Furthermore, the device that performs the first determination processing and the second determination processing, which has been explained as the IC card 1 in the above described examples, is not limited to the IC card, but may be an IC tag, a cellular phone, or the like other than the card type. That is, the communication device that performs noncontact communication by executing the first determination processing and the second determination processing may be incorporated into an electronic device having other functions as a part thereof.

In this specification, the steps described in the flowcharts contain not only the processing that is time-sequentially performed in the described order but also the processing not necessarily time-sequentially performed but performed in parallel or individually.

The embodiments of the invention are not limited to the above described embodiments, but various changes may be made without departing from the scope of the invention.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A communication device comprising:
   demodulating means for demodulating a transmission signal from another communication device that performs noncontact communication;
   calculating means for performing at least one of addition and subtraction of a predetermined voltage according to a logical value of a demodulated signal obtained by demodulation by the demodulating means;
   determining means for determining a communication system of the transmission signal transmitted by the other communication device by comparing a calculation result of the calculating means at predetermined timing after a lapse of a predetermined time from the start of communication with a threshold voltage; and
   transmitting means for transmitting predetermined data to the other communication device in the communication system determined by the determining means among plural communication systems that the device itself can support,
   wherein the calculating means performs addition or subtraction of the predetermined voltage according to the logical value of the demodulated signal in a period from the start of communication to the predetermined timing, and
   wherein the calculation result of the calculating means is a value obtained by converting a ratio of a length of a period of a predetermined logical value of the demodulated signal in the period from the start of communication to the predetermined timing into a voltage value.

2. The communication device according to claim 1, wherein the calculating means performs addition of the predetermined voltage according to a number of switchings of the logical value of the demodulated signal in a period from the start of communication to the predetermined timing.

3. The communication device according to claim 1, wherein the threshold voltage is decided from the maximum value and the minimum value of the calculation result of the calculating means with respect to each of the plural communication systems at the predetermined timing.

4. The communication device according to claim 1, wherein the predetermined timing is set to timing at which the maximum value and the minimum value of the calculation result of the calculating means with respect to each of the plural communication systems do not overlap.

5. The communication device according to claim 1, comprising an IC card or a cellular phone.

6. A communication method using a communication device that performs noncontact communication with another communication device the method comprising the steps of:
- performing at least one of addition and subtraction of a predetermined voltage according to a logical value of a demodulated signal obtained by demodulation of a transmission signal from the other communication device;
- determining a communication system of the transmission signal transmitted by the other communication device by comparing a calculation result at predetermined timing after a lapse of a predetermined time from the start of communication with a threshold voltage; and
- transmitting predetermined data to the other communication device in the communication system determined among plural communication systems that the device itself can support,
- wherein addition or subtraction of the predetermined voltage according to the logical value of the demodulated signal is performed in a period from the start of communication to the predetermined timing, and
- wherein the calculation result is a value obtained by converting a ratio of a length of a period of a predetermined logical value of the demodulated signal in the period from the start of communication to the predetermined timing into a voltage value.

7. A computer program product stored on a non-transitory computer-readable medium for allowing a computer to execute a process comprising the steps of:
- performing at least one of addition and subtraction of a predetermined voltage according to a logical value of a demodulated signal obtained by demodulation of a transmission signal from another communication device that performs noncontact communication;
- determining a communication system of the transmission signal transmitted by the other communication device by comparing a calculation result at predetermined timing after a lapse of a predetermined time from the start of communication with a threshold voltage; and
- transmitting predetermined data to the other communication device in the communication system determined among plural communication systems that the device itself can support,
- wherein addition or subtraction of the predetermined voltage according to the logical value of the demodulated signal is performed in a period from the start of communication to the predetermined timing, and
- wherein the calculation result is a value obtained by converting a ratio of a length of a period of a predetermined logical value of the demodulated signal in the period from the start of communication to the predetermined timing into a voltage value.

8. A communication device comprising:
- demodulating units configured to demodulate a transmission signal from another communication device that performs noncontact communication;
- calculating units configured to perform at least one of addition and subtraction of a predetermined voltage according to a logical value of a demodulated signal obtained by demodulation by the demodulating units;
- determining units configured to determine a communication system of the transmission signal transmitted by the other communication device by comparing a calculation result of the calculating units at predetermined timing after a lapse of a predetermined time from the start of communication with a threshold voltage; and
- transmitting units configured to transmit predetermined data to the other communication device in the communication system determined by the determining units among plural communication systems that the device itself can support,
- wherein the calculating units perform addition or subtraction of the predetermined voltage according to the logical value of the demodulated signal in a period from the start of communication to the predetermined timing, and
- wherein the calculation result of the calculating units is a value obtained by converting a ratio of a length of a period of a predetermined logical value of the demodulated signal in the period from the start of communication to the predetermined timing into a voltage value.

9. A communication device comprising:
- demodulating means for demodulating a transmission signal from another communication device that performs noncontact communication;
- calculating means for performing at least one of addition and subtraction of a predetermined voltage according to a logical value of a demodulated signal obtained by demodulation by the demodulating means;
- determining means for determining a communication system of the transmission signal transmitted by the other communication device by comparing a calculation result of the calculating means at predetermined timing after a lapse of a predetermined time from the start of communication with a threshold voltage; and
- transmitting means for transmitting predetermined data to the other communication device in the communication system determined by the determining means among plural communication systems that the device itself can support,
- wherein the calculating means performs addition of the predetermined voltage according to a number of switchings of the logical value of the demodulated signal in a period from the start of communication to the predetermined timing.

10. The communication device according to claim 9, wherein the calculation result of the calculating means is a value obtained by converting the number of switchings of the logical value in the period from the start of communication to the predetermined timing into a voltage value.

11. The communication device according to claim 10, further comprising extracting means for extracting the switchings of the logical value,
- wherein the calculating means performs addition of the predetermined voltage when the switchings of the logical value are extracted by the extracting means.

12. A communication device comprising:
- demodulating means for demodulating a transmission signal from another communication device that performs noncontact communication;
- calculating means for performing at least one of addition and subtraction of a predetermined voltage according to a logical value of a demodulated signal obtained by demodulation by the demodulating means;
- determining means for determining a communication system of the transmission signal transmitted by the other communication device by comparing a calculation result of the calculating means at predetermined timing after a lapse of a predetermined time from the start of communication with a threshold voltage; and
- transmitting means for transmitting predetermined data to the other communication device in the communication system determined by the determining means among plural communication systems that the device itself can support, wherein the threshold voltage is decided from the maximum value and the minimum value of the calculation result of the calculating means with respect to each of the plural communication systems at the predetermined timing.

13. A communication device comprising:

demodulating means for demodulating a transmission signal from another communication device that performs noncontact communication;

calculating means for performing at least one of addition and subtraction of a predetermined voltage according to a logical value of a demodulated signal obtained by demodulation by the demodulating means;

determining means for determining a communication system of the transmission signal transmitted by the other communication device by comparing a calculation result of the calculating means at predetermined timing after a lapse of a predetermined time from the start of communication with a threshold voltage; and transmitting means for transmitting predetermined data to the other communication device in the communication system determined by the determining means among plural communication systems that the device itself can support, wherein the predetermined timing is set to timing at which the maximum value and the minimum value of the calculation result of the calculating means with respect to each of the plural communication systems do not overlap.

* * * * *